US011075392B2

(12) United States Patent
Shibata

(10) Patent No.: US 11,075,392 B2
(45) Date of Patent: Jul. 27, 2021

(54) FUEL CELL SYSTEM AND METHOD OF ESTIMATING CONTENT OF METAL IONS

(71) Applicant: TOYOTA JIDOSHA KABUSHIKI KAISHA, Toyota (JP)

(72) Inventor: Masao Shibata, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 255 days.

(21) Appl. No.: 16/287,455

(22) Filed: Feb. 27, 2019

(65) Prior Publication Data
US 2019/0319283 A1 Oct. 17, 2019

(30) Foreign Application Priority Data

Apr. 12, 2018 (JP) .............................. JP2018-077162

(51) Int. Cl.
| H01M 8/0444 | (2016.01) |
| H01M 8/04537 | (2016.01) |
| H01M 8/04111 | (2016.01) |
| H01M 8/1004 | (2016.01) |
| H01M 8/04228 | (2016.01) |
| H01M 8/04303 | (2016.01) |
| H01M 8/04746 | (2016.01) |

(52) U.S. Cl.
CPC .... *H01M 8/04477* (2013.01); *H01M 8/04111* (2013.01); *H01M 8/04228* (2016.02); *H01M 8/04303* (2016.02); *H01M 8/04641* (2013.01); *H01M 8/04753* (2013.01); *H01M 8/1004* (2013.01)

(58) Field of Classification Search
CPC ......... H01M 8/04477; H01M 8/04228; H01M 8/04303; H01M 8/04111; H01M 8/04753; H01M 8/1004
See application file for complete search history.

(56) References Cited

U.S. PATENT DOCUMENTS

2017/0104231 A1  4/2017 Jomori

FOREIGN PATENT DOCUMENTS

| JP | 2009-238650 | 10/2009 |
| JP | 2012-028146 | 2/2012 |
| JP | 2012-059586 | 3/2012 |
| JP | 2017-073376 | 4/2017 |
| JP | 2017-174549 | 9/2017 |

*Primary Examiner* — Helen Oi K Conley
(74) *Attorney, Agent, or Firm* — Finnegan, Henderson, Farabow, Garrett & Dunner, LLP

(57) ABSTRACT

A fuel cell system includes: a fuel cell including an MEA including an electrolyte membrane and anode and cathode catalyst layers sandwiching the electrolyte membrane; an impedance measuring device measuring AC impedance of the fuel cell when AC voltage is applied to the fuel cell; an impedance acquisition unit configured to obtain a first imaginary part value of the AC impedance measured when AC voltage with a fixed frequency satisfying Fixed frequency [Hz]×(Thickness of the electrolyte membrane $[\mu m])^2 \leq 500$ [Hz×$\mu m^2$] is applied in a state where a relative humidity of the MEA is 20% or greater, and a fuel gas is present and an oxidant gas is absent in the anode and cathode catalyst layers; and a metal ion estimation unit configured to estimate a content of metal ions in the electrolyte membrane based on the first imaginary part value of the AC impedance.

14 Claims, 26 Drawing Sheets

FUEL CELL SYSTEM AND METHOD OF ESTIMATING CONTENT OF METAL IONS

CROSS-REFERENCE TO RELATED APPLICATION

This application is based upon and claims the benefit of priority of the prior Japanese Patent Application No. 2018-077162, filed on Apr. 12, 2018, the entire contents of which are incorporated herein by reference.

TECHNICAL FIELD

The present disclosure relates to a fuel cell system and a method of estimating the content of metal ions.

BACKGROUND

It has been known that the introduction of metal ions into an electrolyte membrane improves the strength and durability of the electrolyte membrane. On the other hand, it has been also known that too high concentration of metal ions in the electrolyte membrane decreases the power generation performance of the fuel cell. Therefore, various methods for determining the content of metal ions in the electrolyte membrane have been suggested. For example, there has been known a method that estimates the content of metal ions in the electrolyte membrane on the basis of the output voltage of the fuel cell when the output current of the fuel cell is increased in a stepwise manner, as disclosed in, for example, Japanese Patent Application Publication No. 2017-73376 (hereinafter, referred to as Patent Document 1).

SUMMARY

It is therefore an object of the present disclosure to estimate the content of metal ions in an electrolyte membrane with high accuracy.

The above object is achieved by a fuel cell system including: a fuel cell that includes a membrane-electrode assembly, the membrane-electrode assembly including an electrolyte membrane, and an anode catalyst layer and a cathode catalyst layer sandwiching the electrolyte membrane; an impedance measuring device that measures alternating-current impedance of the fuel cell when an alternating-current voltage is applied to the fuel cell; an impedance acquisition unit configured to obtain a first imaginary part value of the alternating-current impedance of the fuel cell measured by the impedance measuring device when an alternating-current voltage with a fixed frequency satisfying Fixed frequency [Hz]×(Thickness of the electrolyte membrane [μm])$^2$≤500 [Hz×μm$^2$] is applied to the fuel cell in a state where a relative humidity of the membrane-electrode assembly is 20% or greater, and a fuel gas is present and an oxidant gas is absent in the anode catalyst layer and the cathode catalyst layer; and a metal ion estimation unit configured to estimate a content of metal ions in the electrolyte membrane on a basis of the first imaginary part value of the alternating-current impedance obtained by the impedance acquisition unit.

In the above configuration, the metal ion estimation unit may be configured to, when the first imaginary part value of the alternating-current impedance is large, estimate that the content of the metal ions in the electrolyte membrane is greater than that when the first imaginary part value of the alternating-current impedance is small.

In the above configuration, the metal ion estimation unit may be configured to estimate the content of the metal ions in the electrolyte membrane on a basis of a third imaginary part value of alternating-current impedance calculated by subtracting a second imaginary part value of alternating-current impedance measured by applying the alternating-current voltage with the fixed frequency to the fuel cell when no metal ion is contained in the electrolyte membrane from the first imaginary part value of the alternating-current impedance.

In the above configuration, the alternating-current voltage with the fixed frequency applied to the fuel cell may oscillate around a voltage within a range of ±10 mV from an open circuit voltage of the fuel cell.

In the above configuration, the alternating-current voltage with the fixed frequency applied to the fuel cell may have an amplitude of 0.6 mV or greater and 100 mV or less.

In the above configuration, the impedance acquisition unit may be configured to obtain the first imaginary part value of the alternating-current impedance when the alternating-current voltage with the fixed frequency is applied to the fuel cell in a state where the relative humidity of the membrane-electrode assembly is 45% or greater, and the fuel gas is present and the oxidant gas is absent in the anode catalyst layer and the cathode catalyst layer.

In the above configuration, the fixed frequency may be 0.01 Hz or greater and 0.1 Hz or less, or 10 Hz or greater and 100 Hz or less.

In the above configuration, the impedance acquisition unit may be configured to obtain the first imaginary part value of the alternating-current impedance when the alternating-current voltage with the fixed frequency further satisfying 10 [Hz×μm$^2$]≤Fixed frequency [Hz]×(Thickness of the electrolyte membrane [μm])$^2$≤500 [Hz×μm$^2$] is applied to the fuel cell.

In the above configuration, when nitrogen and hydrogen that is the fuel gas are present in the anode catalyst layer and the cathode catalyst layer, a ratio of a quantity of hydrogen to a sum of quantities of nitrogen and hydrogen may be 2% or greater.

In the above configuration, a first valve that is located further downstream than a compressor located in an oxidant gas supply pipe that supplies the oxidant gas to the cathode catalyst layer; a second valve that is located in an oxidant gas exhaust pipe that discharges the oxidant gas from the cathode catalyst layer; a valve controller configured to close the first valve and the second valve during a stoppage of power generation by the fuel cell; and a gas controller configured to supply the fuel gas to the anode catalyst layer during the stoppage of the power generation by the fuel cell may be provided, and the metal ion estimation unit may be configured to estimate the content of the metal ions in the electrolyte membrane after a predetermined time passes from closing of the first valve and the second valve.

In the above configuration, a supply connection pipe that connects a fuel gas supply pipe and an oxidant gas supply pipe, the fuel gas supply pipe supplying the fuel gas to the anode catalyst layer, the oxidant gas supply pipe supplying the oxidant gas to the cathode catalyst layer; a valve located in the supply connection pipe; and a gas controller configured to, during a stoppage of power generation by the fuel cell, stop supply of the oxidant gas to the cathode catalyst layer and open the valve so as to supply the fuel gas to the anode catalyst layer and the cathode catalyst layer may be provided, and the metal ion estimation unit may be configured to estimate the content of the metal ions in the electrolyte membrane after a predetermined time passes from opening of the valve opens.

In the above configuration, a setting unit configured to, when the content of the metal ions in the electrolyte membrane estimated by the metal ion estimation unit is greater than a threshold value, conducts a setting for executing at least one of (i) configuring an amount of the oxidant gas supplied to the cathode catalyst layer to be greater than that when the content of the metal ions in the electrolyte membrane estimated by the metal ion estimation unit is less than the threshold value, (ii) configuring a humidity of the oxidant gas supplied to the cathode catalyst layer to be higher than that when the content of the metal ions in the electrolyte membrane estimated by the metal ion estimation unit is less than the threshold value, and (iii) configuring a pressure of the oxidant gas in the cathode catalyst layer to be higher than that when the content of metal ions in the electrolyte membrane estimated by the metal ion estimation unit is less than the threshold value may be provided.

In the above configuration, a peak frequency determination unit configured to determine a peak frequency of the alternating-current voltage at which an imaginary part value of the alternating-current impedance measured by the impedance measuring device has a local maximum value when an alternating-current voltage of which a frequency is swept is applied to the fuel cell; a thickness determination unit configured to determine a thickness of the electrolyte membrane from the peak frequency determined by the peak frequency determination unit; and a fixed frequency determination unit configured to determine the fixed frequency from the thickness of the electrolyte membrane determined by the thickness determination unit may be provided.

The above object is also achieved by a method of estimating a content of metal ions in an electrolyte membrane in a fuel cell that includes the electrolyte membrane, and an anode catalyst layer and a cathode catalyst layer sandwiching the electrolyte membrane, the method including: obtaining an imaginary part value of alternating-current impedance of the fuel cell when an alternating-current voltage with a fixed frequency satisfying Fixed frequency [Hz]×(Thickness of the electrolyte membrane $[\mu m])^2 \leq 500$ [Hz×$\mu m^2$] is applied to the fuel cell in a state where a relative humidity of the membrane-electrode assembly is 20% or greater, and a fuel gas is present and an oxidant gas is absent in the anode catalyst layer and the cathode catalyst layer; and estimating the content of the metal ions in the electrolyte membrane on a basis of the imaginary part value of the alternating-current impedance that has been obtained.

BRIEF DESCRIPTION OF THE DRAWINGS

FIG. 6B is changed to (Frequency of alternating-current Voltage)×(Thickness of the electrolyte membrane)$^2$;

DETAILED DESCRIPTION

The method of estimating the content of metal ions disclosed in Patent Document 1 has room for improvement in the precise estimation of the content of metal ions in the electrolyte membrane.

Hereinafter, with reference to the accompanying drawings, embodiments of the present disclosure will be described.

First Embodiment

Figure 1:
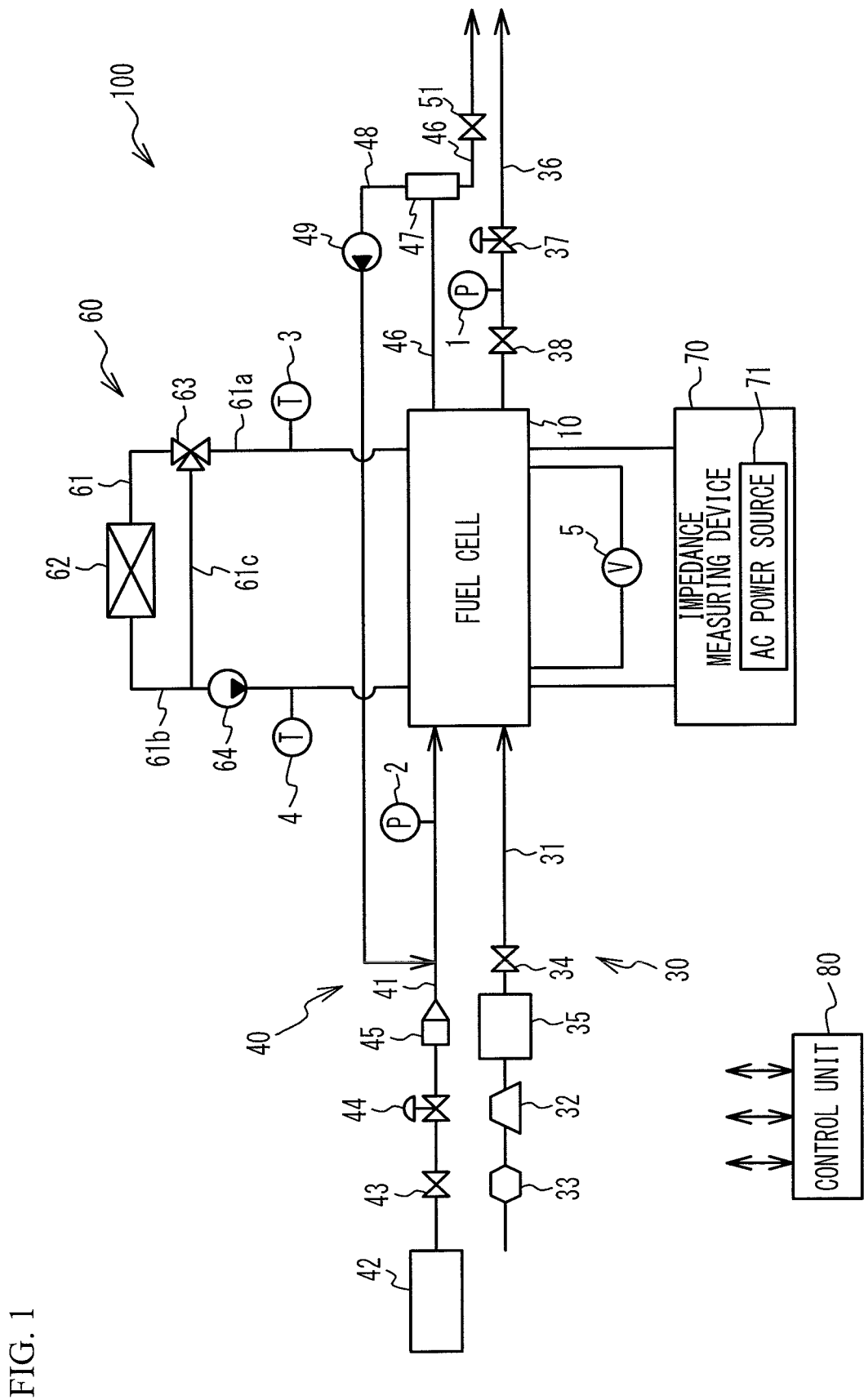
FIG. 1 is a schematic diagram illustrating a structure of a fuel cell system in accordance with a first embodiment.

FIG. 1 is a schematic diagram illustrating a structure of a fuel cell system in accordance with a first embodiment. A fuel cell system 100 is a power generation system that is installed on, for example, a fuel cell vehicle, and outputs electric power Used as drive power in accordance with a request from a driver. As illustrated in FIG. 1, the fuel cell system 100 includes a fuel cell 10, an oxidant gas piping system 30, a fuel gas piping system 40, a coolant piping system 60, an impedance measuring device 70, and a control unit 80. The fuel cell system 100 also includes a power system including a battery, a converter, an inverter, and a motor, but the illustration and the description thereof are omitted.

The oxidant gas piping system 30 supplies an oxidant gas (e.g., air) called a cathode gas to the fuel cell 10, and discharges a cathode exhaust gas not consumed in the fuel cell 10. The fuel gas piping system 40 supplies a fuel gas (e.g., hydrogen) called an anode gas to the fuel cell 10, and discharges an anode exhaust gas not consumed in the fuel cell 10. The coolant piping system 60 circulates a coolant that cools the fuel cell 10 to the fuel cell 10. The impedance measuring device 70 applies an alternating-current (AC) voltage to the fuel cell 10 to measure the AC impedance of the fuel cell 10. The control unit 80 totally controls the entire system. The fuel cell 10 is equipped with a voltage sensor 5. The voltage sensor 5 is connected between unit cells of the fuel cell 10, measures the voltage of the fuel cell 10, and transmits the measured voltage to the control unit 80.

Figure 2:
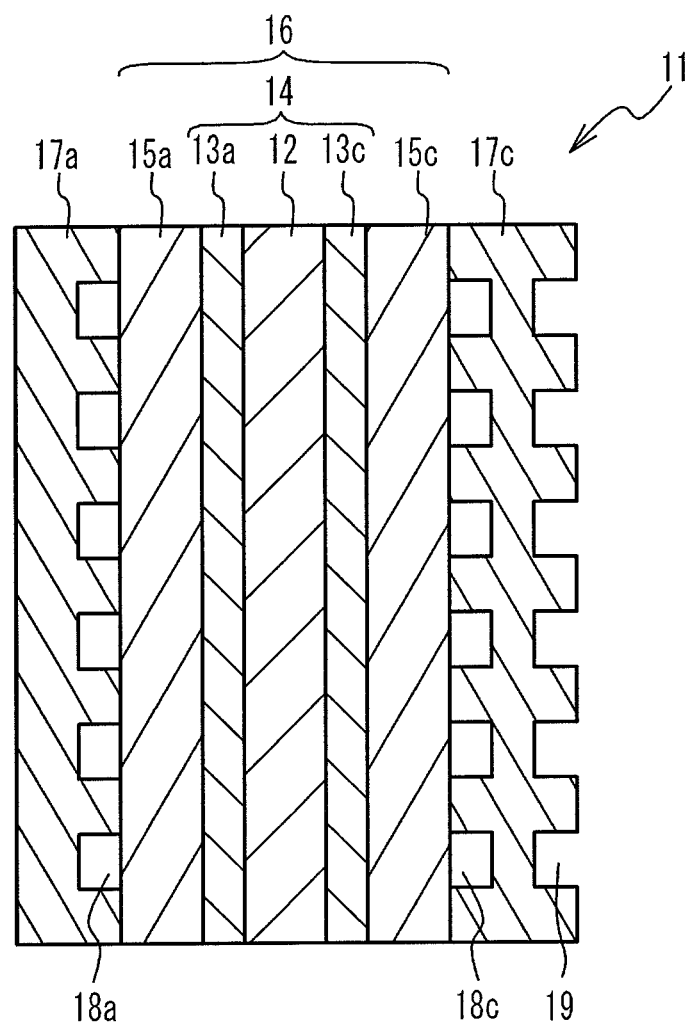
FIG. 2 is a cross-sectional view of a unit cell.

The fuel cell 10 is a polymer electrolyte fuel cell that is supplied with a cathode gas and an anode gas to generate power. The fuel cell 10 has a stack structure in which a plurality of unit cells are stacked. FIG. 2 is a cross-sectional view of the unit cell. As illustrated in FIG. 2, a unit cell 11 includes a membrane electrode gas diffusion layer assembly (hereinafter, referred to as an MEGA) 16, and an anode separator 17a and a cathode separator 17c that sandwich the MEGA 16. The MEGA 16 includes an anode gas diffusion layer 15a and a cathode gas diffusion layer 15c, and a membrane electrode assembly (hereinafter, referred to as an MEA) 14.

The MEA 14 includes an electrolyte membrane 12, an anode catalyst layer 13a located on a first surface of the electrolyte membrane 12, and a cathode catalyst layer 13c located on a second surface of the electrolyte membrane 12. The electrolyte membrane 12 is a solid polymer membrane Ruined of, for example, a fluorine-based resin material having a sulfonate group or a hydrocarbon-based resin material having a sulfonate group, and has good proton conductivity in wet condition. Each of the anode catalyst layer 13a and the cathode catalyst layer 13c contains a carbon support (carbon black or the like) supporting a catalyst (such as platinum or platinum-cobalt alloy), which speeds up the rate of an electrochemical reaction, and an ionomer, which is solid polymer having a sulfonate group and has good proton conductivity in wet condition.

The anode gas diffusion layer 15a and the cathode gas diffusion layer 15c are formed of members having gas permeability and electron conductivity, and are formed of porous fiber members such as, for example, a carbon fiber or a graphitic fiber.

The anode separator 17a and the cathode separator 17c are formed of members having a gas barrier property and electron conductivity. For example, the anode separator 17a and the cathode separator 17c are formed of metal members that are made of stainless steel, aluminum, or titanium and have uneven shapes formed by bending by press molding, or carbon members made of dense carbon formed by compressing carbon so as not to allow a gas to pass therethrough. The anode separator 17a has an anode gas passage 18a that is formed on the surface, which is in contact with the anode gas diffusion layer 15a, of the anode separator 17a. An anode gas supplied to the anode gas diffusion layer 15a and the anode catalyst layer 13a during power generation by the fuel cell 10 flows through the anode gas passage 18a. The cathode separator 17c has a cathode gas passage 18c that is formed on the surface, which is in contact with the cathode gas diffusion layer 15c, of the cathode separator 17c. A cathode gas supplied to the cathode gas diffusion layer 15c and the cathode catalyst layer 13c during power generation by the fuel cell 10 flows through the cathode gas passage 18c. A coolant passage 19 through which a coolant flows is formed on the surface, which is in contact with the anode separator 17a of the adjacent unit cell 11, of the cathode separator 17c.

As illustrated in FIG. 1, the oxidant gas piping system 30 includes an oxidant gas supply pipe 31, an air compressor 32, an air flow meter 33, an opening/closing valve 34, a humidifying module 35, an oxidant gas exhaust pipe 36, a regulating valve 37, an opening/closing valve 38, and a pressure sensor 1.

The oxidant gas supply pipe 31 is a pipe connected to the inlet of the cathode gas supply manifold of the fuel cell 10. The air compressor 32 is coupled to the fuel cell 10 through the oxidant gas supply pipe 31, takes in external air, and supplies compressed air to the fuel cell 10 as a cathode gas. The air flow meter 33 is installed in the oxidant gas supply pipe 31, is located further upstream than the air compressor 32, measures the volume of air introduced to the air compressor 32, and transmits the measured volume to the control unit 80. The control unit 80 controls the drive of the air compressor 32 on the basis of the measured value by the air flow meter 33 to control the amount of air supplied to the fuel cell 10. The opening/closing valve 34 is, for example, an electromagnetic valve, is located between the air compressor 32 and the fuel cell 10, and opens and closes in accordance with the instruction from the control unit 80 to control the flow of air from the air compressor 32 into the fuel cell 10. The humidifying module 35 humidifies high-pressure air delivered from the air compressor 32.

The oxidant gas exhaust pipe 36 is a pipe coupled to the outlet of the cathode gas exhaust manifold of the fuel cell 10, and discharges a cathode exhaust gas to the outside of the fuel cell system 100. The regulating valve 37 regulates the pressure of the cathode exhaust gas in the oxidant gas exhaust pipe 36 (back pressure at the cathode side of the fuel cell 10). The pressure sensor 1 is installed in the oxidant gas exhaust pipe 36, is located further upstream than the regulating valve 37, measures the pressure of the cathode exhaust gas, and transmits the measured pressure to the control unit 80. The control unit 80 adjusts the opening degree of the regulating valve 37 on the basis of, for example, the measured value by the pressure sensor 1. The opening/closing valve 38 is, for example, an electromagnetic valve, and opens and closes in accordance with the instruction from the control unit 80 to control the flow of air from the fuel cell 10 to the outside.

The fuel gas piping system 40 includes a fuel gas supply pipe 41, a hydrogen tank 42, an opening/closing valve 43, a regulator 44, an injector 45, a pressure sensor 2, a fuel gas exhaust pipe 46, a gas-liquid separator 47, a fuel gas circulation pipe 48, a circulation pump 49, and an opening/closing valve 51.

The hydrogen tank 42 is coupled to the inlet of the anode gas supply manifold of the fuel cell 10 through the fuel gas supply pipe 41. The opening/closing valve 43, the regulator 44, the injector 45, and the pressure sensor 2 are arranged in the fuel gas supply pipe 41 in this order from the upstream side (the hydrogen tank 42 side). The opening/closing valve 43 is, for example, an electromagnetic valve, and opens and closes in accordance with the instruction from the control unit 80 to control the flow of hydrogen from the hydrogen tank 42 into a part located further upstream than the injector 45. The regulator 44 is a pressure reducing valve for adjusting the pressure of hydrogen in the part located further upstream than the injector 45, and its opening degree is controlled by the control unit 80. The injector 45 is, for example, an electromagnetic opening/closing valve, and supplies, as an anode gas, hydrogen from the hydrogen tank 42 to the fuel cell 10. The pressure sensor 2 measures the pressure of hydrogen in the part located further downstream than the injector 45, and transmits the measured pressure to the control unit 80. The control unit 80 controls the injector 45 on the basis of the measured value by the pressure sensor 2 to control the amount of hydrogen supplied to the fuel cell 10.

The fuel gas exhaust pipe 46 is a pipe coupled to the outlet of the anode gas exhaust manifold of the fuel cell 10. An anode exhaust gas containing unreacted gas (hydrogen, nitrogen, or the like), which was not used in a power generation reaction, flows through the fuel gas exhaust pipe 46. The fuel gas exhaust pipe 46 is equipped with the gas-liquid separator 47. In addition to the fuel gas exhaust pipe 46, the fuel gas circulation pipe 48 is coupled to the gas-liquid separator 47. The gas-liquid separator 47 separates a gas component and water contained in the anode exhaust gas, guides the gas component to the fuel gas circulation pipe 48, and guides water to the fuel gas exhaust pipe 46. The fuel gas circulation pipe 48 is coupled to the fuel gas supply pipe 41 at the position located further downstream than the injector 45. The fuel gas circulation pipe 48 is equipped with the circulation pump 49. The circulation pump 49 delivers hydrogen contained in the gas component separated in the gas-liquid separator 47 to the fuel gas supply pipe 41. The use efficiency of hydrogen is improved by circulating hydrogen contained in the anode exhaust gas to supply hydrogen to the fuel cell 10 again in the above-described manner.

Water separated in the gas-liquid separator 47 is discharged to the outside through the fuel gas exhaust pipe 46. The opening/closing valve 51 is, for example, an electromagnetic valve, is located in the fuel gas exhaust pipe 46 at the position located further downstream than the gas-liquid separator 47, and opens and closes in accordance with the instruction from the control unit 80. During operation of the fuel cell system 100, the control unit 80 closes the opening/closing valve 51 in normal times and opens the opening/closing valve 51 at a predetermined timing such as a predetermined drainage timing or the timing for discharging an inert gas in the anode exhaust gas.

The coolant piping system 60 includes a coolant pipe 61, a radiator 62, a three-way valve 63, a circulation pump 64, and temperature sensors 3 and 4. The coolant pipe 61 is a pipe for circulating a coolant for cooling the fuel cell 10, and is composed of an upstream pipe 61a, a downstream pipe 61b, and a bypass pipe 61c. The upstream pipe 61a connects the outlet of the coolant exhaust manifold located in the fuel cell 10 and the inlet of the radiator 62. The downstream pipe 61b connects the inlet of the coolant supply manifold located in the fuel cell 10 and the outlet of the radiator 62. A first end of the bypass pipe 61c is coupled to the upstream pipe 61a through the three-way valve 63, and a second end of the bypass pipe 61c is coupled to the downstream pipe 61b. The control unit 80 adjusts the amount of a coolant flowing into the bypass pipe 61c by controlling the opening/closing of the three-way valve 63, thereby controlling the amount of a coolant flowing into the radiator 62.

The radiator 62 is located in the coolant pipe 61, and exchanges heat between the coolant flowing through the coolant pipe 61 and external air to cool the coolant. The circulation pump 64 is located further downstream (is located closer to the fuel cell 10) than the part to which the bypass pipe 61c is connected in the downstream pipe 61b, and drives in accordance with the instruction from the control unit 80. The temperature sensors 3 and 4 are respectively located in the upstream pipe 61a and the downstream pipe 61b, measure the temperature of a coolant, and transmit the measured temperature to the control unit 80. The control unit 80 detects the temperature of the fuel cell 10 from, for example, the measured value by the temperature sensor 3. Alternatively, the control unit 80 detects the temperature difference inside the fuel cell 10 from, for example, the difference between the measured values by the temperature sensors 3 and 4. The control unit 80 controls the rotation speed of the circulation pump 64 on the basis of the detected temperature or the detected temperature difference of the fuel cell 10 to adjust the temperature of the fuel cell 10.

The impedance measuring device 70 may include an AC power source 71 that applies an AC voltage to the fuel cell 10, or may not necessarily include the AC power source 71. The impedance measuring device 70 measures the AC impedance of the fuel cell 10 when an AC voltage is applied between the anode and the cathode of the fuel cell 10 on the basis of the instruction from the control unit 80. An AC voltage may be applied to the fuel cell 10 by the AC power source 71, or may be applied by converting the voltage from a secondary battery by an inverter. The impedance measuring device 70 may measure the AC impedance of the entire fuel cell 10 when an AC voltage is applied to the entire fuel cell 10 having a stack structure (for example, when an AC voltage is applied between a pair of terminal plates), or may measure the AC impedance of each unit cell 11 when an AC voltage is applied to each unit cell 11 constituting the fuel cell 10.

The control unit 80 is configured to include a microcomputer including a central processing unit (CPU), a random access memory (RAM), a read only memory (ROM), and a memory. The memory is a nonvolatile memory such as, for example, a hard disk drive (HDD) or a flash memory. The control unit 80 controls each unit of the fuel cell system 100 on the basis of input sensor signals in an integrated manner to control the operation of the fuel cell system 100. The memory stores operation programs for the fuel cell system 100, and various maps and various threshold values used for the control of the fuel cell system 100. The control unit 80 controls the valves, the circulation pump, the air compressor, and other components on the basis of, for example, sensor signals to control the operation of the fuel cell system 100. The control unit 80 also executes a process of estimating the content of metal ions in the electrolyte membrane 12 of the fuel cell 10. This process is executed by an impedance acquisition unit, a metal ion content estimation unit, a valve control unit, and a gas control unit that are programmed so as to be functionally implemented by the CPU, the RAM, the ROM, and the memory of the control unit 80.

Here, the experiment conducted by the inventor will be described. The inventor fabricated a plurality of fuel cells, and conducted an experiment in which an AC voltage was applied to the fabricated fuel cell to measure the AC impedance. In the experiment described hereinafter, the anode catalyst layer 13a and the cathode catalyst layer 13c were configured to be in the state where hydrogen was present but oxygen was absent therein, an AC voltage was applied to the fuel cell in this state, and the AC impedance was measured. In the experiment, fuel cells A through E formed of materials listed in Table 1 were used, and fuel cells having different contents of metal ions in the electrolyte membrane 12 were fabricated with respect to the fuel cells A through E.

to be 0.2 mg/cm$^2$. The fuel cell C was configured to be the same as the fuel cell B except that cerium ions were contained as metal ions in the electrolyte membrane 12. The fuel cell D was configured to be the same as the fuel cell A except that Nafion NR 211, manufactured by Sigma-Aldrich Co., having a thickness of 25 μm was used for the electrolyte membrane 12. The fuel cell E was configured to be the same as the fuel cell A except that Aquivion E98-05S, manufactured by Sigma-Aldrich Co., having a thickness of 50 μm was used for the electrolyte membrane 12.

A description will be given of an experiment that evaluated the effect of the content of metal ions in the electrolyte membrane 12 on the frequency characteristic of the AC impedance. The ratio of the number of metal ions that have substituted protons in the electrolyte membrane 12 to the total number of the metal ions and protons in the electrolyte membrane 12 (hereinafter, referred to as a substitution ratio of metal ions) was used as an indicator of the content of metal ions in the electrolyte membrane 12. The ratio of the number of metal ions to the total number of the metal ions and protons in the electrolyte membrane 12 may be used as an indicator of the content of metal ions in the electrolyte membrane 12. In the experiment, the fuel cell A in Table 1 was used, and the substitution ratio of cobalt ions in the electrolyte membrane 12 was configured to be 0%, 5%, or 10%.

TABLE 1

| Fuel cell | Electrolyte membrane | Catalyst layer | Diffusion layer | Metal ion |
|---|---|---|---|---|
| A | Nafion NR 212 (Thickness: 50 μm) | Catalyst: TEC10E50E<br>Catalyst support density: 0.1 mg/cm$^2$<br>I/C: 0.75<br>Ionomer: DE2020 CS Type | Sigracet 24-BC | Cobalt ion |
| B | Nafion NR 212 (Thickness: 50 μm) | Catalyst: TEC10E50E<br>Catalyst support density: 0.2 mg/cm$^2$<br>I/C: 0.75<br>Ionomer: DE2020 CS Type | Sigracet 24-BC | Cobalt ion |
| C | Nafion NR 212 (Thickness: 50 μm) | Catalyst: TEC10E50E<br>Catalyst support density: 0.2 mg/cm$^2$<br>I/C: 0.75<br>Ionomer: DE2020 CS Type | Sigracet 24-BC | Cerium ion |
| D | Nafion NR 211 (Thickness: 25 μm) | Catalyst: TEC10E50E<br>Catalyst support density: 0.1 mg/cm$^2$<br>I/C: 0.75<br>Ionomer: DE2020 CS Type | Sigracet 24-BC | Cobalt ion |
| E | Aquivion E98-05S (Thickness: 50 μm) | Catalyst: TEC10E50E<br>Catalyst support density: 0.1 mg/cm$^2$<br>I/C: 0.75<br>Ionomer: DE2020 CS Type | Sigracet 24-BC | Cobalt ion |

As presented in Table 1, in the fuel cell A, Nafion NR 212, manufactured by Sigma-Aldrich Co., having a thickness of 50 μm was used for the electrolyte membrane 12. TEC 10E50E, manufactured by TANAKA KIKINZOKU KOGYO K.K., in which the carbon support supports a platinum catalyst, was used for the anode catalyst layer 13a and the cathode catalyst layer 13c. DE2020 CS type, manufactured by Wako Pure Chemical Corporation, was used as ionomers. The catalyst support density was configured to be 0.1 mg/cm$^2$, the ratio of the weight I of the ionomer to the weight C of the carbon support (I/C) was configured to be 0.75. Sigracet 24-BC, manufactured by SGL Co., was used for the anode gas diffusion layer 15a and the cathode gas diffusion layer 15c. Cobalt ions were contained as metal ions in the electrolyte membrane 12.

Figure 3:
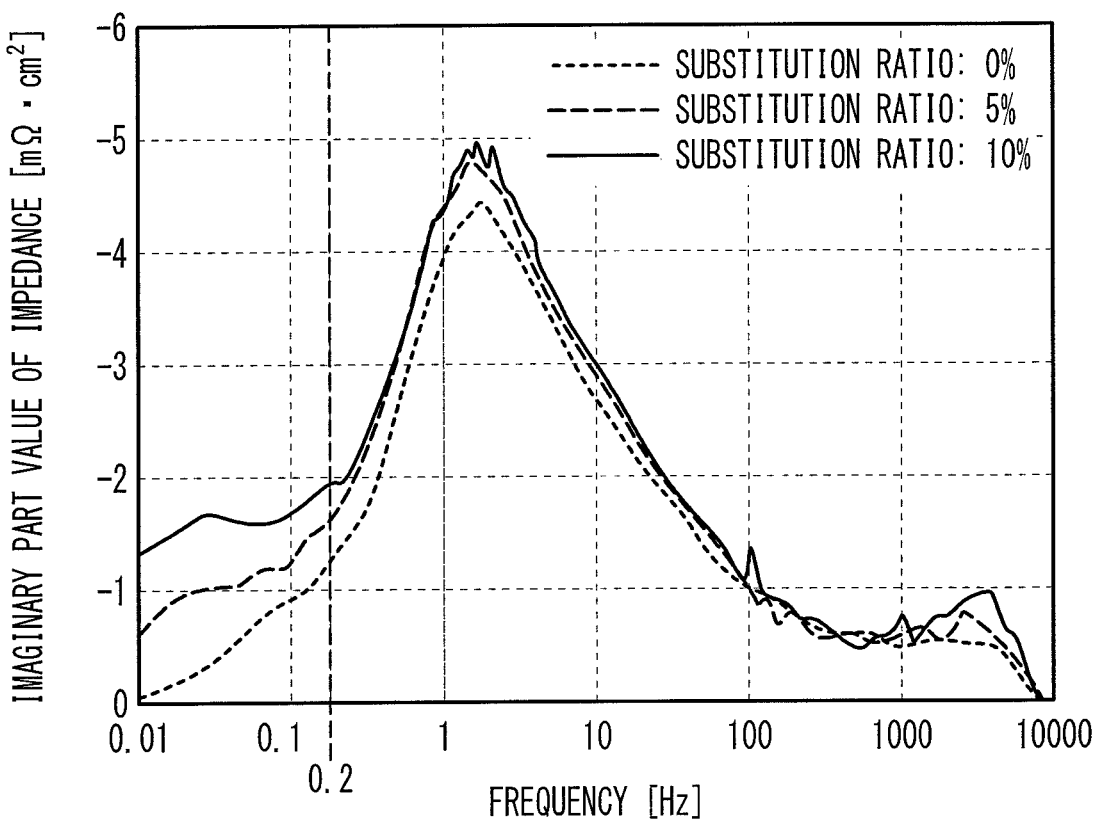
FIG. 3 illustrates measurement results of the frequency characteristic of alternating-current impedance when the content of metal ions in an electrolyte membrane was varied.

The fuel cell B was configured to be the same as the fuel cell A except that the catalyst support density was configured FIG. 3 illustrates measurement results of the frequency characteristic of the AC impedance when the content of metal ions in the electrolyte membrane was varied. In FIG. 3, the horizontal axis represents the frequency of the AC voltage, and the vertical axis represents the imaginary part value of the AC impedance. FIG. 3 reveals that when the frequency of the AC voltage applied to the fuel cell A is 0.2 Hz or less, the imaginary part value of the AC impedance greatly differs among the different substitution ratios of cobalt ions in the electrolyte membrane 12. As the substitution ratio of cobalt ions in the electrolyte membrane 12 increases, the absolute value of the imaginary part value of the AC impedance increases. The reason is considered as follows. The metal ions in the electrolyte membrane 12 move through the electrolyte membrane 12 in accordance with the concentration gradient of the metal ions, the concentration gradient of water, and a potential gradient. Thus, when an AC voltage is applied to the fuel cell, the metal ions move through the electrolyte membrane 12 in accordance with the potential gradient, and as a result, the concentration distribution of the metal ions changes. When the metal ions move through the electrolyte membrane 12, the metal ions move with water molecules in the electrolyte membrane 12. Thus, when an AC voltage is applied to the fuel cell, the metal ions move through the electrolyte membrane 12 with water molecules in the electrolyte membrane 12, and as a result, the water molecules in the area from which the metal ions have moved in the electrolyte membrane 12 decreases, and thereby, the proton conductivity resistance may temporarily increase. As the content of the metal ions in the electrolyte membrane 12 is larger, more water molecules move, and the increase in proton conductivity resistance becomes thereby larger. The change in proton conductivity resistance can be quantitatively measured as the imaginary part value of the AC impedance. These are considered as the reason why in FIG. 3, as the substitution ratio of cobalt ions in the electrolyte membrane 12 increases, the absolute value of the imaginary part value of the AC impedance increases.

Figure 4:
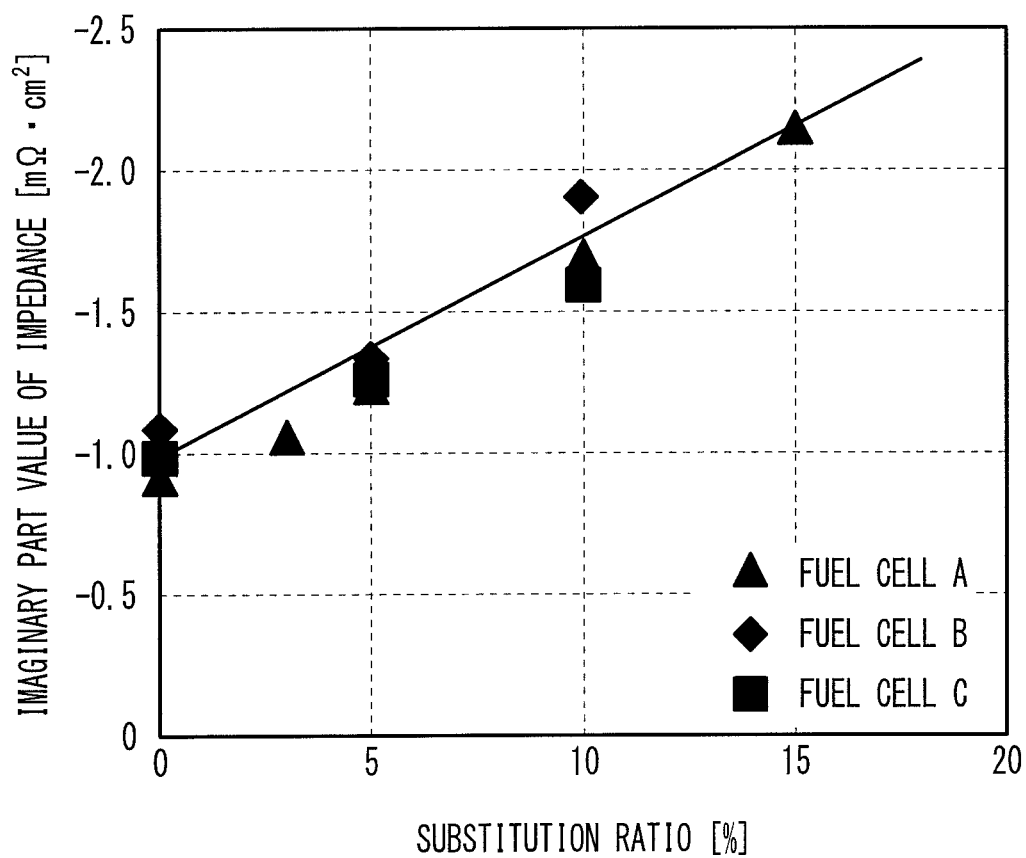
FIG. 4 is a diagram evaluating a relationship between the substitution ratio of metal ions in the electrolyte membrane and the imaginary part value of the alternating-current impedance.

Next, a description will be given of an experiment that evaluated the relationship between the content of metal ions in the electrolyte membrane 12 and the imaginary part value of the AC impedance with use of the fuel cells A through C in Table 1. In the experiment, the substitution ratio of cobalt ions or cerium ions in the electrolyte membrane 12 was varied, and the imaginary part value of the AC impedance when the frequency of the AC voltage was 0.1 Hz was measured. FIG. 4 is a diagram evaluating the relationship between the substitution ratio of metal ions in the electrolyte membrane and the imaginary part value of the AC impedance. In FIG. 4, the horizontal axis represents the substitution ratio, and the vertical axis represents the imaginary part value of the AC impedance when the frequency of the AC voltage is 0.1 Hz. FIG. 4 reveals that in any of the fuel cells A through C, as the substitution ratio of metal ions varies, the imaginary part value of the AC impedance varies, and when the substitution ratio of metal ions is the same, the imaginary part value of the AC impedance is approximately the same, and can be approximated by a linear function.

The experiment results presented in FIG. 3 and FIG. 4 reveal that the content of metal ions in the electrolyte membrane 12 can be estimated by applying an AC voltage with a fixed frequency of 0.2 Hz or less to the fuel cell and obtaining the imaginary part value of the AC impedance when an AC voltage with a fixed frequency of 0.2 Hz or less is applied. The metal ions mixed into the electrolyte membrane 12 substitute protons in the electrolyte membrane 12 regardless of the kind of the metal ion. Thus, even when the metal ions in the electrolyte membrane 12 are metal cations other than cobalt ions and cerium ions, it is considered that the same result as the result obtained in FIG. 4 is obtained.

Here, in the experiments in FIG. 3 and FIG. 4, the anode catalyst layer 13a and the cathode catalyst layer 13c were configured to be in the state where hydrogen was present and oxygen was absent, and the AC impedance was measured in this state. The reason will be described hereinafter.

When only hydrogen is present or hydrogen and nitrogen are present in the anode catalyst layer 13a and the cathode catalyst layer 13c, formation of the potential gradient that causes a current to flow from the anode to the cathode causes a reaction: $H_2 \rightarrow 2H^+ + 2e^-$ in the anode catalyst layer 13a and a reaction: $2H^+ + 2e^- \rightarrow H_2$ in the cathode catalyst layer 13c. On the other hand, formation of the potential gradient that causes a current to flow from the cathode to the anode causes a reaction: $2H^+ + 2e^- \rightarrow H_2$ in the anode catalyst layer 13a and a reaction: $H_2\ 2H^+ + 2e^-$ in the cathode catalyst layer 13c. Both reactions: $H_2\ 2H^+ + 2e^-$ and $2H^+ + 2e^- \rightarrow H_2$ are the reactions of which the reaction resistance is low.

For example, when only oxygen is present or oxygen and nitrogen are present in the cathode catalyst layer 13c, formation of the potential gradient that causes a current to flow from the anode to the cathode causes a reaction: $O_2 + 4H^+ + 4e \rightarrow 2H_2O$ in the cathode catalyst layer 13c. On the other hand, formation of the potential gradient that causes a current to flow from the cathode to the anode causes reactions: $2H_2O \rightarrow O_2 + 4H^+ + 4e^-$ and $C + 2H_2O \rightarrow CO_2 + 4H^+ + 4e^-$ in the cathode catalyst layer 13c. These reactions are the reactions of which the reaction resistance is greater than those of the reactions: $H_2 \rightarrow 2H^+ + 2e^-$ and $2H^+ + 2e^- \rightarrow H_2$. Thus, when the AC impedance is measured in the state where only oxygen is present or oxygen and nitrogen are present in the cathode catalyst layer 13c, because of transport delay of a gas such as oxygen and water, the imaginary part value of the AC impedance increases, and the change in the imaginary part value of the AC impedance due to the content of metal ions in the electrolyte membrane 12 becomes difficult to recognize. That is, it becomes difficult to estimate the content of metal ions in the electrolyte membrane 12 from the imaginary part value of the AC impedance as described in FIG. 3 and FIG. 4.

In addition, for example, when only nitrogen is present in the cathode catalyst layer 13c, formation of the potential gradient that causes a current to flow from the anode to the cathode causes a reaction: $2H^+ + 2e^- \rightarrow H_2$ in the cathode catalyst layer 13c, while formation of the potential gradient that causes a current to flow from the cathode to the anode causes little steady reaction. Since a steady reaction hardly occurs, as in the case where only oxygen is present or oxygen and nitrogen are present in the cathode catalyst layer 13c, the high reaction resistance increases the imaginary part value of the AC impedance, thereby making it difficult to estimate the content of metal ions in the electrolyte membrane 12 from the imaginary part value of the AC impedance.

As described above, the reaction resistances in the anode catalyst layer 13a and the cathode catalyst layer 13c are made to be low by measuring the AC current in the state where hydrogen (a fuel gas) is present and oxygen (an oxidant gas) is absent in the anode catalyst layer 13a and the cathode catalyst layer 13c. This configuration allows the small change, which is the vibration of the metal ions, to be detected by the imaginary part value of the AC impedance, and as a result, it becomes possible to estimate the content of metal ions in the electrolyte membrane 12 from the imaginary part value of the AC impedance. The reaction: $H_2 \rightarrow 2H^+ + 2e^-$ and the reaction: $2H^+ + 2e^- \rightarrow H_2$ proceed on the catalyst surfaces of the anode catalyst layer 13a and the cathode catalyst layer 13c near the electrolyte membrane 12. Thus, the parts apart from the electrolyte membrane 12 of the anode catalyst layer 13a and the cathode catalyst layer 13c are unlikely to be affected by the reaction: $H_2 \rightarrow 2H^+ + 2e^-$ and the reaction: $2H^+ + 2e^- \rightarrow H_2$. Therefore, the method of estimating the content of metal ions from the imaginary part value of the AC impedance corresponds to estimating the content of metal ions in the electrolyte membrane 12.

Next, an experiment that evaluated the effect of the material forming the electrolyte membrane 12 on the frequency characteristic of the AC impedance will be described. In the experiment, the fuel cell A and the fuel cell E in Table 1 were used, and the substitution ratio of cobalt ions in the electrolyte membrane 12 was configured to be 0% and 10% in each of the fuel cell A and the fuel cell E. FIG.

Figure 5:
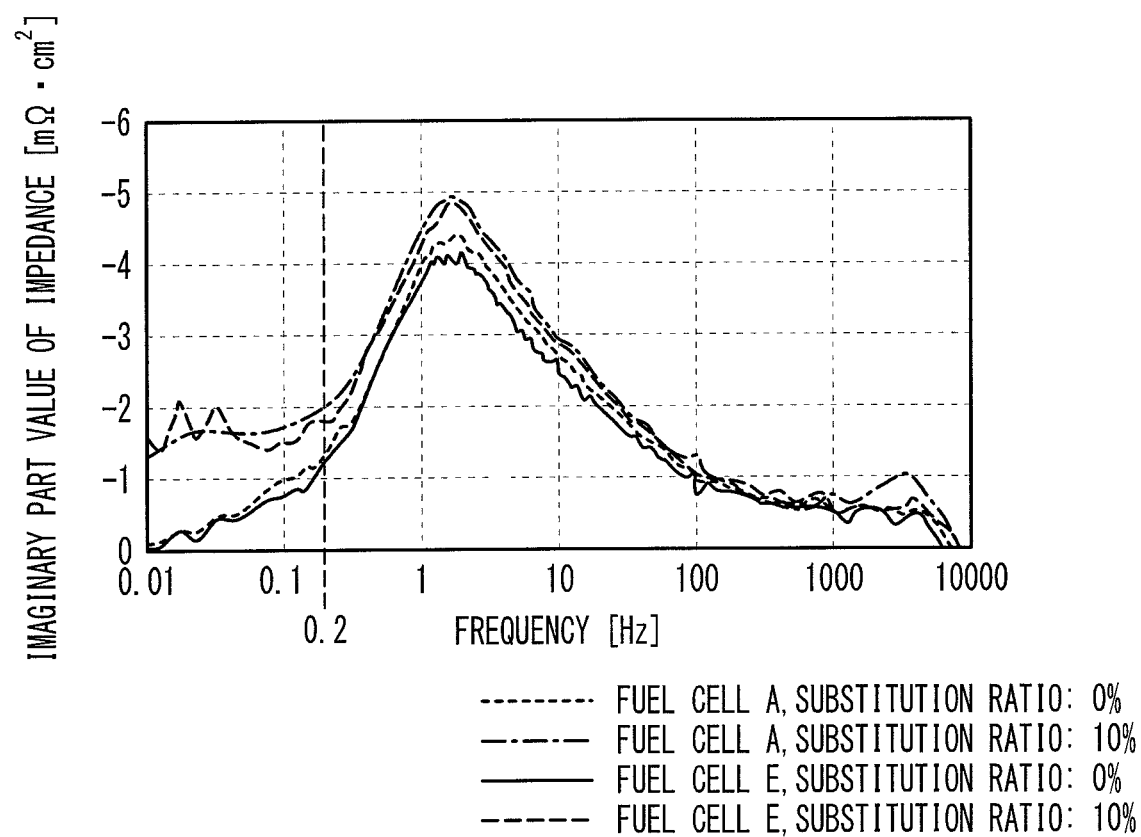
FIG. 5 illustrates measurement results of the frequency characteristic of the alternating-current impedance when different materials were used to form the electrolyte membrane.

5 illustrates measurement results of the frequency characteristic of the AC impedance when different materials were used to form the electrolyte membrane. In FIG. 5, the horizontal axis represents the frequency of the AC voltage, and the vertical axis represents the imaginary part value of the AC impedance. FIG. 5 reveals that in both the fuel cell A, in which the electrolyte membrane 12 was formed of Nafion NR 212, and the fuel cell E, in which the electrolyte membrane 12 was formed of Aquivion E98-05S, when the frequency of the AC voltage is 0.2 Hz or less, the difference in imaginary part value of the AC impedance changes depending on the substitution ratio of cobalt ions in the electrolyte membrane 12. This result reveals that regardless of the kind of the material forming the electrolyte membrane 12, the content of metal ions in the electrolyte membrane 12 can be estimated by applying an AC voltage with a fixed frequency of 0.2 Hz or less to the fuel cell 10 and obtaining the imaginary part value of the AC impedance when a fixed frequency of 0.2 Hz or less is applied.

Figure 6A:
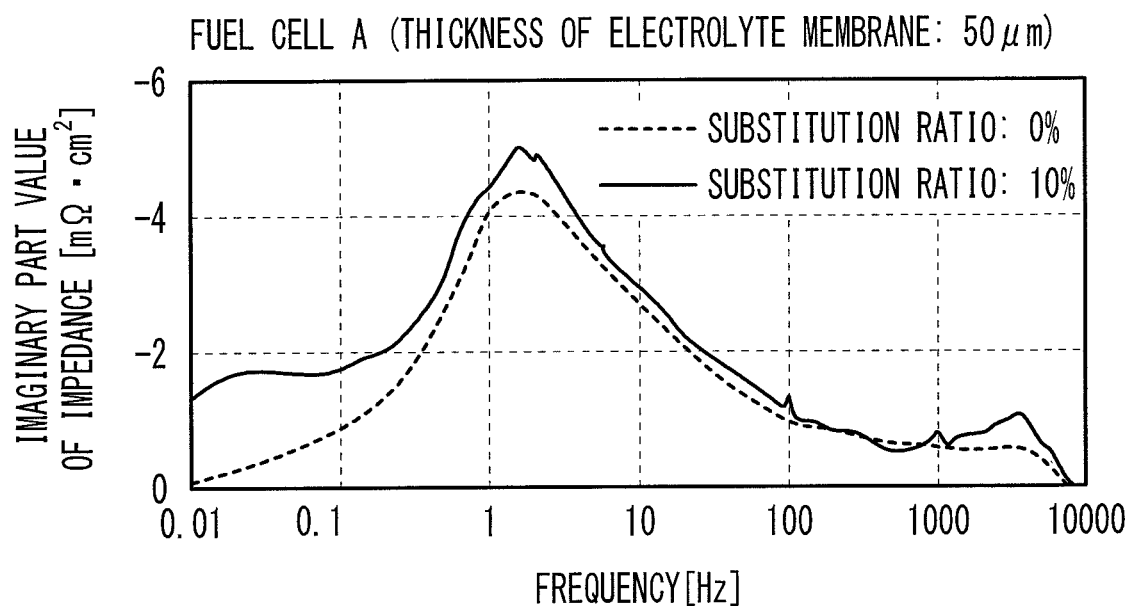
FIG. 6A and FIG. 6B illustrate measurement results of the frequency characteristic of the alternating-current impedance when the thickness of the electrolyte membrane was varied.
Figure 6B:
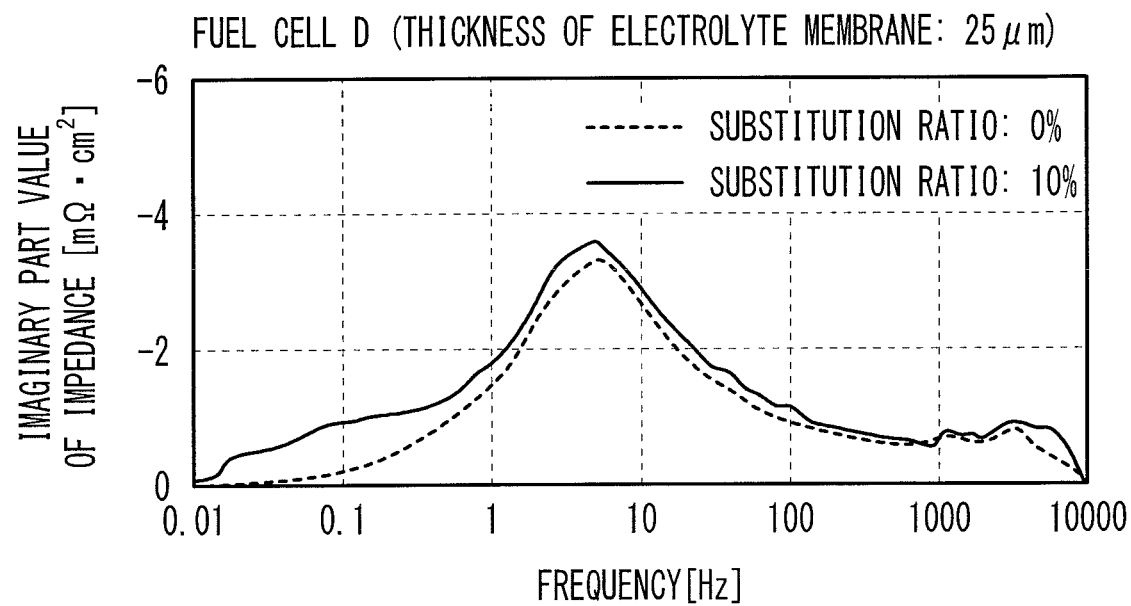

Next, an experiment that evaluated the effect of the thickness of the electrolyte membrane 12 on the frequency characteristic of the AC impedance will be described. In the experiment, the fuel cell A and the fuel cell D in Table 1 were used, and the substitution ratio of cobalt ions in the electrolyte membrane 12 was configured to be 0% and 10% in each of the fuel cell A and the fuel cell D. FIG. 6A and FIG. 6B illustrate measurement results of the frequency characteristic of the AC impedance when the thickness of the electrolyte membrane was varied. FIG. 6A illustrates measurement results of the frequency characteristic of the AC impedance of the fuel cell A including the electrolyte membrane 12 with a thickness of 50 μm, while FIG. 6B illustrates measurement results of the frequency characteristic of the AC impedance of the fuel cell D including the electrolyte membrane 12 with a thickness of 25 μm. In FIG. 6A and FIG. 6B, the horizontal axis represents the frequency of the AC voltage, and the vertical axis represents the imaginary part value of the AC impedance. As illustrated in FIG. 6A and FIG. 6B, in the fuel cell D of which the thickness of the electrolyte membrane 12 is thin, 25 μm, the peak frequency at which the imaginary part value of the AC impedance has a local maximum value is higher than that of the fuel cell A of which the thickness of the electrolyte membrane 12 is thick, 50 μm.

Here, it has been known in theory that the frequency of the imaginary part value of the AC impedance due to the substance transport delay is inversely proportional to the square of the thickness. That is, it has been known that Frequency f [Hz]=Constant k/(Thickness t [μm])$^2$. Here, according to FIG. 3 and FIG. 4 described above, when the thickness of the electrolyte membrane 12 is 50 μm, the imaginary part value of the AC impedance greatly differs among the different substitution ratios of metal ions in the electrolyte membrane 12 when the fixed frequency of the AC voltage applied to the fuel cell 10 is 0.2 Hz or less. Thus, taking the thickness of 50 μm of the electrolyte membrane 12 and the fixed frequency of 0.2 Hz in this case and the above expression, Frequency f [Hz]=Constant k/(Thickness t [μm])$^2$ into consideration, it is considered that the effect of the thickness of the electrolyte membrane 12 is reduced and the content of metal ions in the electrolyte membrane 12 is thereby well estimated from the imaginary part value of the AC impedance when the value of (Frequency of the AC Voltage)×(Thickness of the electrolyte membrane)$^2$ is 500 [Hz×μm$^2$] or less. In addition, from FIG. 6B, in the case where the thickness of the electrolyte membrane 12 is 25 μm, when the fixed frequency is 0.8 Hz or less, the imaginary part value of the AC impedance greatly differs between the different substitution ratios of metal ions in the electrolyte membrane 12. Also in this case, the condition that the value of (Frequency of the AC Voltage)×(Thickness of the electrolyte membrane)$^2$ is 500 [Hz×μm$^2$] or less is satisfied.

Figure 7A:
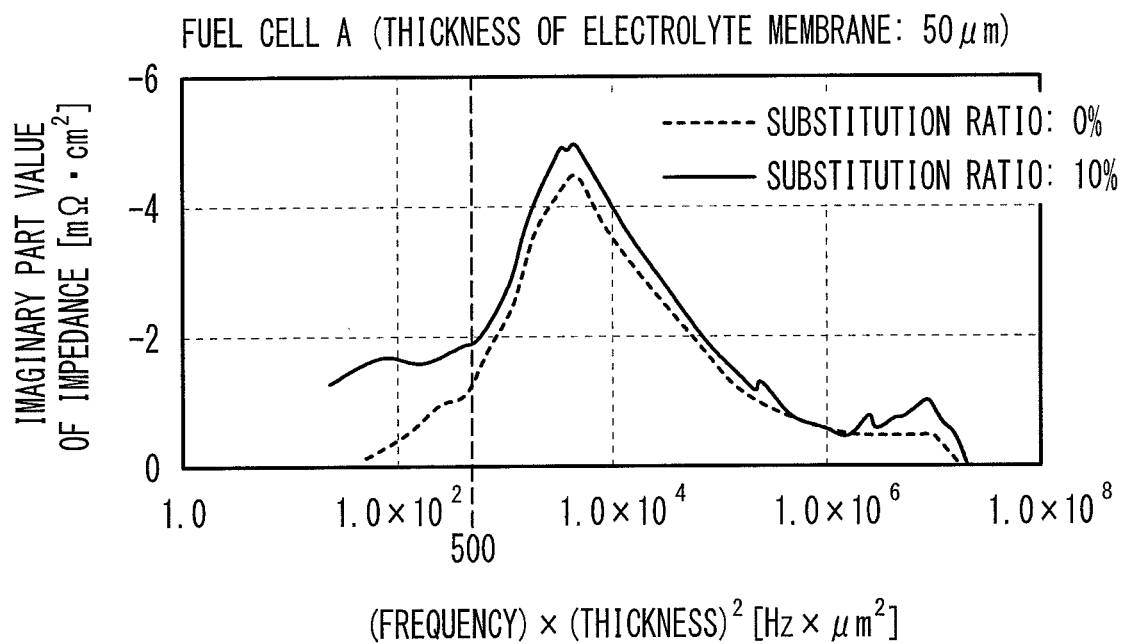
FIG. 7A and FIG. 7B are graphs when the horizontal axis in FIG. 6A
Figure 7B:
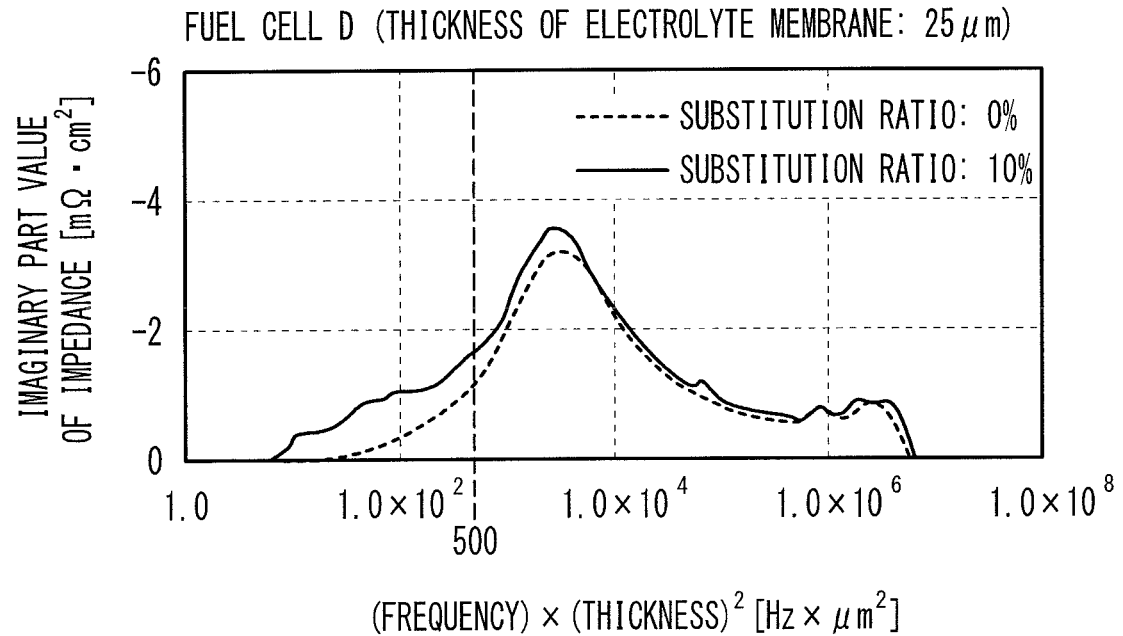

FIG. 7A and FIG. 7B are diagrams in which the horizontal axis of FIG. 6A and FIG. 6B is changed to (Frequency of the AC Voltage)×(Thickness of the electrolyte membrane)$^2$. As illustrated in FIG. 7A and FIG. 7B, the horizontal axis of (Frequency of the AC Voltage)×(Thickness of the electrolyte membrane)$^2$ reveals that the peak frequency at which the imaginary part value of the AC impedance has a local maximum value is approximately the same even when the thickness of the electrolyte membrane 12 varies. In both the fuel cell A and the fuel cell D of which the thickness of the electrolyte membrane 12 differs, when the value of (Frequency of the AC Voltage)×(Thickness of the electrolyte membrane)$^2$ is less than 500 [Hz×μm$^2$], depending on the substitution ratio of cobalt ions in the electrolyte membrane 12, the difference in imaginary part value of the AC impedance greatly changes. Thus, by setting the frequency of the AC voltage applied to the fuel cell 10 at the fixed frequency that satisfies (Frequency of the AC Voltage)×(Thickness of the electrolyte membrane)$^2$≤500 [Hz×μm$^2$], even when the thickness of the electrolyte membrane 12 differs, the content of metal ions in the electrolyte membrane 12 is well estimated from the imaginary part value of the AC impedance.

Figure 8:
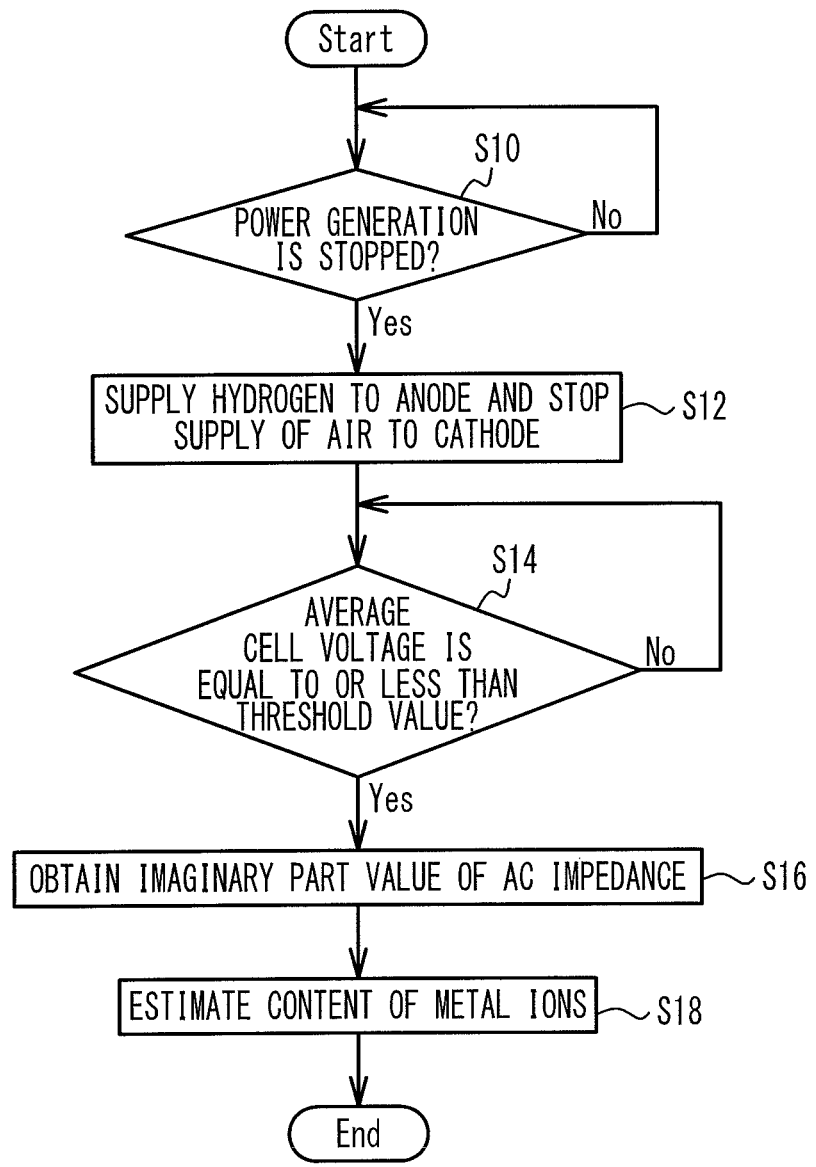
FIG. 8 is a flowchart illustrating a method of estimating the content of metal ions in the first embodiment.

Thus, on the basis of the above results, a method of estimating the content of metal ions in the electrolyte membrane 12 from the imaginary part value of the AC impedance will be described. FIG. 8 is a flowchart illustrating a method of estimating the content of metal ions in the first embodiment. As illustrated in FIG. 8, the control unit 80 waits until the control unit 80 detects an ignition-off signal that stops the power generation by the fuel cell 10 (step S10).

After detecting the ignition-off signal (step S10: Yes), the control unit 80 maintains the supply of hydrogen to the anode catalyst layer 13a and stops the supply of air to the cathode catalyst layer 13c (step S12). For example, the control unit 80 opens the opening/closing valve 43, the regulator 44, and the injector 45 located in the fuel gas supply pipe 41 and opens the opening/closing valve 51 in the fuel gas exhaust pipe 46 to supply hydrogen to the anode. After opening the opening/closing valve 34 in the oxidant gas supply pipe 31 and the opening/closing valve 38 in the oxidant gas exhaust pipe 36 and controlling the regulating valve 37 in the oxidant gas exhaust pipe 36 to make the cathode back pressure equal to the atmospheric pressure and supply air to the cathode, the control unit 80 closes the opening/closing valve 34 and the opening/closing valve 38 to stop the supply of air to the cathode.

Here, it is assumed that the fuel cell 10 stops after generating power at a temperature of the fuel cell 10 of approximately 65° C., for example. Hereinafter, for the sake of simplicity, the estimation in the state where no hydrogen is supplied after power generation is stopped is conducted. In this case, immediately after the control at step S12, for example, the anode space that includes the anode catalyst layer 13a and is sealed by the opening/closing valve 43 and the opening/closing valve 51 in the fuel cell system 100 contains hydrogen with a pressure of 100 kPa, and the cathode space that includes the cathode catalyst layer 13c and is sealed by the opening/closing valve 34 and the opening/closing valve 38 in the fuel cell system 100 contains nitrogen with a pressure of 79 kPa and oxygen with a pressure of 21 kPa. Here, it is assumed that the volume of the anode space is approximately equal to the volume of the cathode space. Thereafter, as time passes, hydrogen in the anode catalyst layer 13a and nitrogen and oxygen in the cathode catalyst layer 13c diffuse through the electrolyte membrane 12, and a reaction: $2H_2+O_2 \rightarrow 2H_2O$ proceeds in both the anode catalyst layer 13a and the cathode catalyst layer 13c. Thus, when sufficient time has passed, the anode catalyst layer 13a contains nitrogen with a pressure of 39.5 kPa, hydrogen with a pressure of 29 kPa, and water vapor with a pressure of 21 kPa, and the cathode catalyst layer 13c contains nitrogen with a pressure of 39.5 kPa, hydrogen with a pressure of 29 kPa, and water vapor with a pressure of 21 kPa. As described above, the reaction: $2H_2+O_2 \rightarrow 2H_2O$ produces water vapor, and thereby, the relative humidity of the MEA 14 increases. For example, when the temperature of the fuel cell 10 remains at approximately 65° C., since the saturated vapor pressure is 25 kPa, the relative humidity of the MEA 14 is approximately 84% RH. When the temperature of the fuel cell 10 is less than 65° C. because of heat dissipation, the relative humidity of the MEA 14 is further greater than 84% RH. When the fuel cell 10 stops power generation after the fuel cell vehicle conducts normal operation, the temperature of the fuel cell 10 is approximately 65° C. Even when the supply of hydrogen is maintained after power generation is stopped, the saturated vapor pressure and the partial pressure of water vapor are the same as those of the calculation examples described above. Thus, the relative humidity becomes the same. When the correlation between the temperature when the power generation by the fuel cell 10 is stopped and the relative humidity of the MEA 14 when sufficient time has passed from the closing of the opening/closing valve 34 and the opening/closing valve 38 is obtained in advance, the relative humidity of the MEA 14 when sufficient time has passed after the closing of the opening/closing valve 34 and the opening/closing valve 38 can be obtained from the temperature when the power generation by the fuel cell 10 is stopped.

As described above, the execution of the control at step S12 establishes the state where the relative humidity of the MEA 14 is 20% RH or greater, and hydrogen (a fuel gas) is present and oxygen (an oxidant gas) is absent in the anode catalyst layer 13a and the cathode catalyst layer 13c. The control unit 80 may stop the supply of hydrogen to the anode by closing the opening/closing valve 43 and the opening/closing valve 51 after a predetermined time passes from the stoppage of the supply of air to the cathode by closing the opening/closing valve 34 and the opening/closing valve 38. The predetermined time may be a time until the amount of hydrogen contained in the MEA 14 is sufficiently greater than the amount of oxygen and oxygen is practically absent because of the reaction: $2H_2+O_2 \rightarrow 2H_2O$ in the anode catalyst layer 13a and the cathode catalyst layer 13c. In addition, the control unit 80 may close the opening/closing valve 34 and the opening/closing valve 38 and the opening/closing valve 43 and the opening/closing valve 51 at the same time. In this case, it is sufficient if hydrogen equal to or greater than two times of the quantity of oxygen in the cathode space remains in the anode space when each opening/closing valve is closed so that all oxygen in the cathode space is consumed. Here, the reason why the relative humidity of the MEA 14 is preferably 20% RH or greater will be described on the basis of the experiment conducted by the inventor.

Figure 9A:
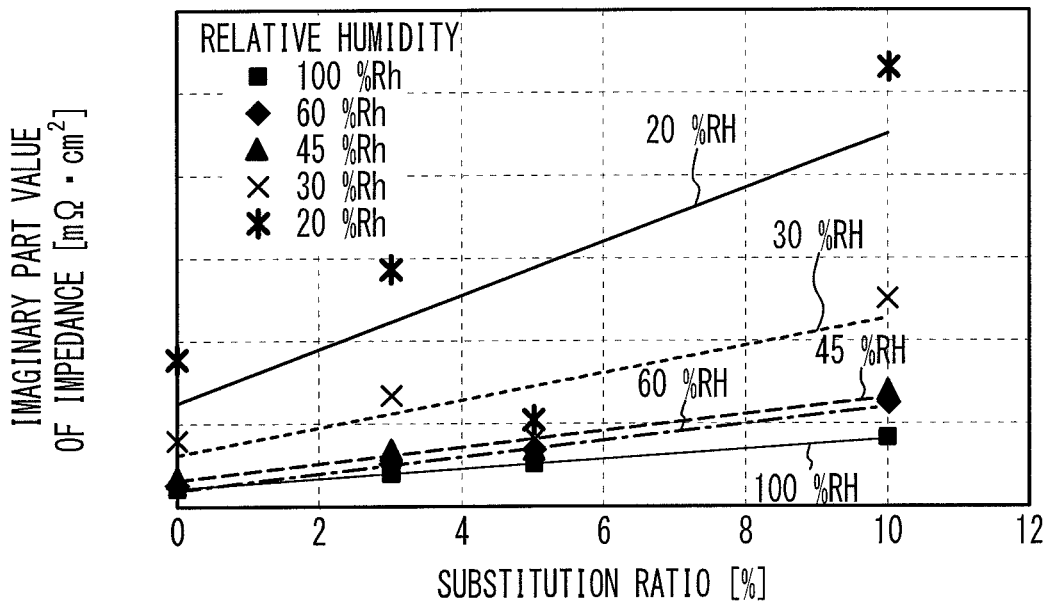
FIG. 9A is a diagram evaluating the imaginary part value of the alternating-current impedance with respect to the substitution ratio when the relative humidity of a membrane-electrode assembly was varied.
Figure 9B:
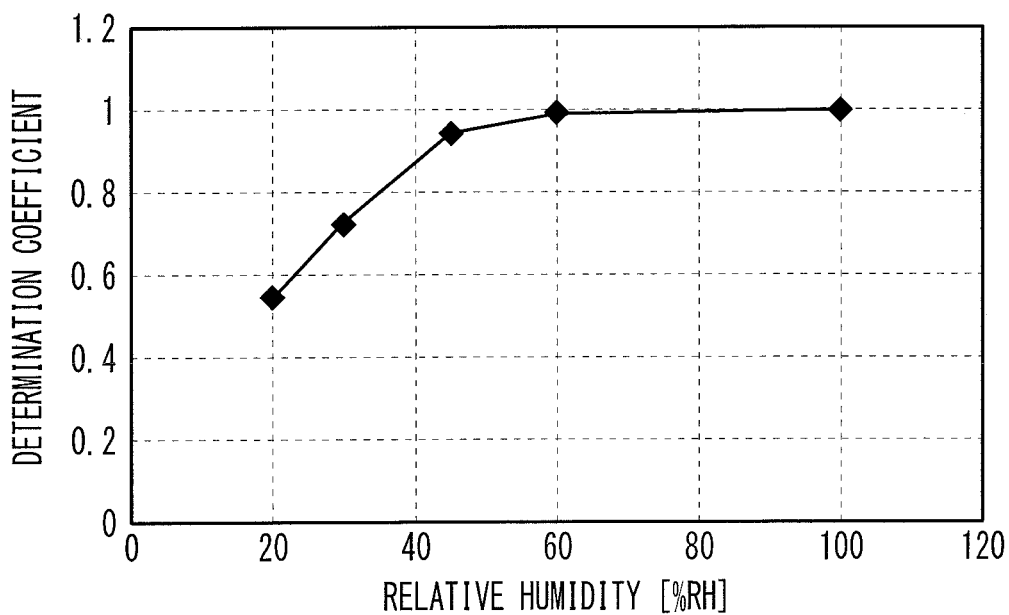
FIG. 9B illustrates a relationship, which was obtained from FIG. 9A, between the relative humidity of the membrane-electrode assembly and a determination coefficient.

The inventor conducted an experiment that evaluated the effect of the relative humidity of the MEA 14 on the imaginary part value of the AC impedance. The experiment was conducted for the case where the relative humidity of the MEA 14 was 20% RH, 30% RH, 45% RH, 60% RH, or 100% RH. FIG. 9A is a diagram evaluating the imaginary part value of the AC impedance with respect to the substitution ratio when the relative humidity of the MEA 14 was varied, and FIG. 9B illustrates the relationship between the relative humidity of the MEA 14 and the determination coefficient obtained from FIG. 9A. In FIG. 9A, the horizontal axis represents the substitution ratio, and the vertical axis represents the imaginary part value of the AC impedance. In FIG. 9B, the horizontal axis represents the relative humidity of the MEA 14, and the vertical axis represents the determination coefficient. The determination coefficient is a coefficient obtained by using the linear regression analysis, and can be calculated by Determination coefficient=(Sum of the squared deviation of the predicted value of the objective variable)/(Sum of the squared deviation of the observation value of the objective variable). The determination coefficient is a value between 0 and 1, and the determination coefficient closer to 1 indicates higher accuracy of the predicted value.

FIG. 9B reveals that when the relative humidity of the MEA 14 is 20% or greater, the determination coefficient is 0.5 or greater, and the content of metal ions in the electrolyte membrane 12 is estimated with high accuracy from the imaginary part value of the AC impedance. To estimate the content of metal ions in the electrolyte membrane 12 from the imaginary part value of the AC impedance with higher accuracy, the relative humidity of the MEA 14 is preferably 30% or greater, more preferably 45% or greater, further preferably 60% or greater. The reason why the imaginary part value of the AC impedance varies and the determination coefficient is thereby small when the relative humidity of the MEA 14 is low is considered because the conductivity of the metal ions decreases when the relative humidity of the electrolyte membrane 12 is low, and as a result, the movements of metal ions with water due to the application of an AC voltage easily vary.

Referring back to FIG. 8, after executing step S12, the control unit 80 waits until the average cell voltage of the fuel cell 10 becomes equal to or less than a threshold value (for example, 0.2 V) (step S14). The cell voltage is measured by the voltage sensor 5. As described above, in the anode catalyst layer 13a and the cathode catalyst layer 13c, the reaction: $2H_2+O_2 \rightarrow 2H_2O$ proceeds. The average cell voltage when the reaction sufficiently proceeds and oxygen (an oxidant gas) is practically absent in the anode catalyst layer 13a and the cathode catalyst layer 13c can be determined as the threshold value.

When the average cell voltage of the fuel cell 10 is equal to or less than the threshold value (step S14: Yes), the control unit 80 controls the impedance measuring device 70 to obtain the imaginary part value of the AC impedance of the fuel cell 10 (step S16). That is, the control unit 80 instructs the impedance measuring device 70 to apply an AC voltage with a fixed frequency that satisfies (Frequency of the AC voltage)×(Thickness of the electrolyte membrane)$^2 \leq 500$ [Hz·μm$^2$] (hereinafter, referred to as the AC voltage of the first condition) to the fuel cell 10 to measure the AC impedance of the fuel cell 10. Alternatively, the control unit 80 converts a voltage from a secondary battery by an inverter and applies an AC voltage with a fixed frequency that satisfies (Frequency of the AC voltage)×(Thickness of the electrolyte membrane)$^2 \leq 500$ [Hz·μm$^2$] to the fuel cell 10, and instructs the impedance measuring device 70 to measure the AC impedance of the fuel cell 10. For example, issued is an instruction to measure the AC impedance when an AC voltage with a fixed frequency of 0.1 Hz, a bias voltage of 0 V, and an amplitude of 5 mV is applied to the fuel cell 10 for 50 seconds. Then, the control unit 80 obtains the imaginary part value of the AC impedance from the AC impedance measured by the impedance measuring device 70. Here, the imaginary part value of the AC impedance obtained at step S16 is referred to as a first imaginary part value.

Figure 10:
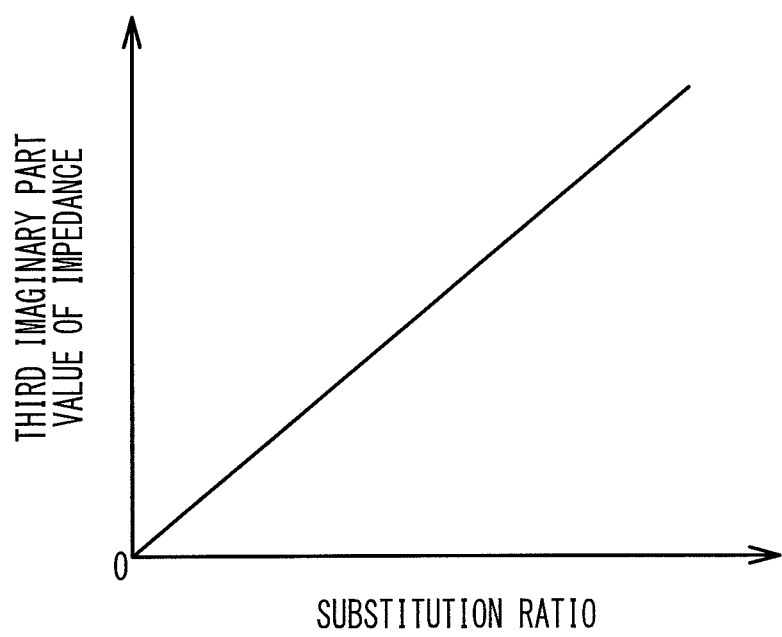
FIG. 10 illustrates a relationship between the substitution ratio of metal ions in the electrolyte membrane and the imaginary part value of the alternating-current impedance.

Then, the control unit 80 estimates the content of metal ions in the electrolyte membrane 12 on the basis of the first imaginary part value of the AC impedance obtained at step S16 (step S18). For example, the memory of the control unit 80 stores a second imaginary part value of the AC impedance measured by applying the AC voltage of the first condition to the fuel cell 10 when the electrolyte membrane 12 contains no metal ions. The control unit 80 calculates the difference between the first imaginary part value of the AC impedance obtained at step S16 and the second imaginary part value of the AC impedance when the electrolyte membrane 12 contains no metal ions, which is stored in the memory in advance, as a third imaginary part value of the AC impedance. The memory of the control unit 80 stores a map showing the relationship between the substitution ratio of metal ions in the electrolyte membrane 12 and the third imaginary part value of the AC as illustrated in FIG. 10. The control unit 80 estimates the content of metal ions in the electrolyte membrane 12 with use of the calculated third imaginary part value of the AC impedance and the map stored in the memory illustrated in FIG. 10. The memory of the control unit 80 may store a map showing the relationship between the substitution ratio of metal ions in the electrolyte membrane 12 and the first imaginary part value of the AC impedance illustrated in FIG. 4. The control unit 80 may estimate the content of metal ions in the electrolyte membrane 12 with use of the first imaginary part value of the AC impedance obtained at step S16 and the map stored in the memory illustrated in FIG. 4.

In the first embodiment, the control unit 80 applies an AC voltage with a fixed frequency that satisfies the following condition A to the fuel cell 10 in the state where the relative humidity of the MEA 14 is 20% or greater and a fuel gas is present and oxidant gas is absent in the anode catalyst layer 13a and the cathode catalyst layer 13c, and obtains the imaginary part value of the AC impedance of the fuel cell 10 at that time.

(Fixed frequency [Hz])×(Thickness of the electrolyte membrane [μm])$^2$≤500 [Hz·μm$^2$]     Condition A:

Then, the control unit 80 estimates the content of metal ions in the electrolyte membrane 12 on the basis of the obtained imaginary part value of the AC impedance. This configuration allows the content of metal ions in the electrolyte membrane 12 to be estimated from the imaginary part value of the AC impedance with high accuracy as described in FIG. 7A and FIG. 7B. As clear from FIG. 4 and FIG. 10, when the imaginary part value of the AC impedance is large, the control unit 80 estimates that the content of metal ions in the electrolyte membrane 12 is greater than the content of metal ions in the electrolyte membrane 12 when the imaginary part value of the AC impedance is small. The state where an oxidant gas is absent in the anode catalyst layer 13a and the cathode catalyst layer 13c includes the state where a tiny amount of oxidant gas that hardly affects the estimation of the content of metal ions from the imaginary part value of the AC impedance is present, and it is sufficient if the ratio of the quantity of an oxidant gas to the quantity of all gases contained in the catalyst layer is 5% or less, 3% or less, or 1% or less, for example.

The first embodiment has described, as an example, a case where the fixed frequency of the AC voltage applied to the fuel cell 10 satisfies (Fixed frequency)×(Thickness of the electrolyte membrane)$^2$≤500 [Hz·μm$^2$]. As clear from FIG. 7A and FIG. 7B, as the value of (Fixed frequency)×(Thickness of the electrolyte membrane)$^2$ decreases, the difference in the imaginary part value of the AC impedance due to the difference in the content of metal ions in the electrolyte membrane 12 further increases. Thus, to estimate the content of metal ions in the electrolyte membrane 12 with higher accuracy, the fixed frequency of the AC voltage applied to the fuel cell 10 preferably satisfies (Fixed frequency)×(Thickness of the electrolyte membrane)$^2$≤250 [Hz·μm$^2$], more preferably satisfies (Fixed frequency)×(Thickness of the electrolyte membrane)$^2$≤200 [Hz·μm$^2$], further preferably satisfies (Fixed frequency)×(Thickness of the electrolyte membrane)$^2$≤150 [Hz·μm$^2$], yet further preferably satisfies (Fixed frequency)×(Thickness of the electrolyte membrane)$^2$≤100 [Hz·μm$^2$]. In addition, the fixed frequency of the AC voltage applied to the fuel cell 10 preferably satisfies (Fixed frequency)×(Thickness of the electrolyte membrane)$^2$≥10 [Hz·μm$^2$], more preferably satisfies (Fixed frequency)×(Thickness of the electrolyte membrane)$^2$≥50 [Hz·μm$^2$]. In the case where the value of (Fixed frequency)×(Thickness of the electrolyte membrane)$^2$ is less than 10 [Hz·μm$^2$], as illustrated in FIG. 7B, even when the substitution ratio of metal ions contained in the electrolyte membrane 12 differs, the difference in the imaginary part value of the AC impedance may be small. The large fixed frequency reduces the time required to measure impedance.

As described at step S18 in FIG. 8, the control unit 80 calculates the third imaginary part value of the AC impedance by subtracting the second imaginary part value of the AC impedance measured by applying the AC voltage of the first condition to the fuel cell 10 when the electrolyte membrane 12 contains no metal ions from the first imaginary part value of the AC impedance obtained at step S16. Then, the control unit 80 estimates the content of metal ions in the electrolyte membrane 12 on the basis of the third imaginary part value of the AC impedance. This configuration allows the content of metal ions in the electrolyte membrane 12 to be estimated with high accuracy.

As described in FIG. 9B, to estimate the content of metal ions in the electrolyte membrane 12 with higher accuracy, the relative humidity of the MEA 14 is preferably 30% or greater, more preferably 45% or greater, further preferably 60% or greater.

Figure 11:
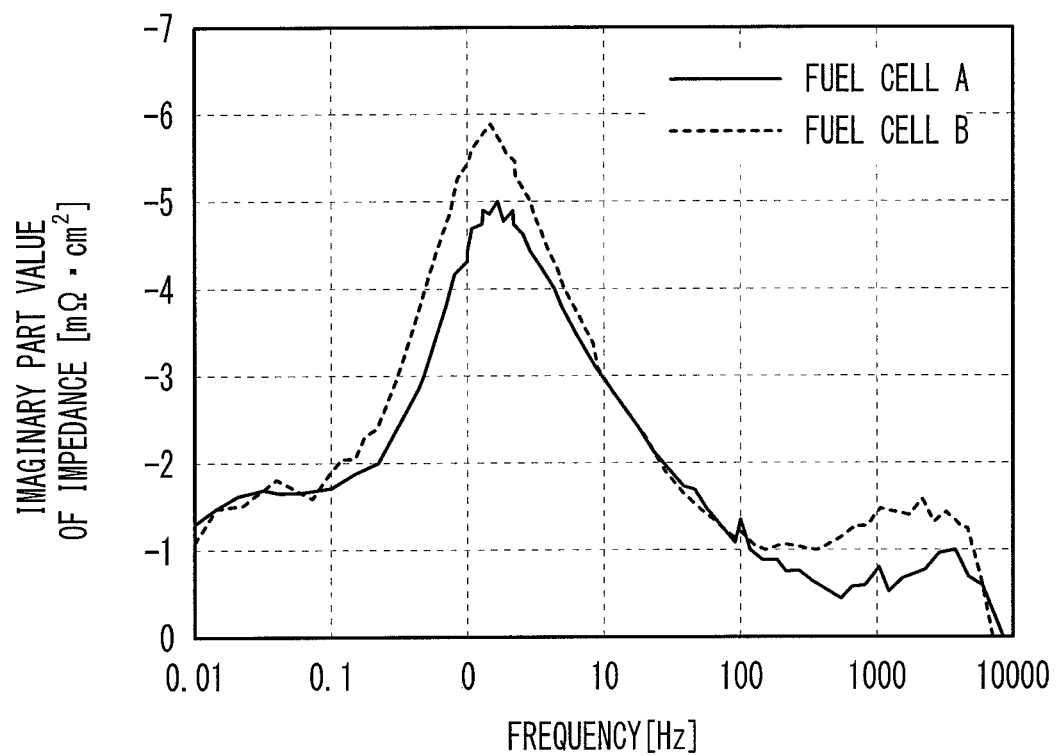
FIG. 11 illustrates measurement results of the frequency characteristic of the alternating-current impedance when different catalysts were used for a catalyst layer.

In the first embodiment, the fixed frequency of the AC voltage applied to the fuel cell 10 is preferably 0.01 Hz or greater and 0.1 Hz or less, or 10 Hz or greater and 100 Hz or less. The reason will be described on the basis of the experiment conducted by the inventor. The inventor conducted an experiment for evaluating the effect of the catalyst used for the catalyst layer on the frequency characteristic of the AC impedance with use of the fuel cell A and the fuel cell B presented in Table 1. In the experiment, in both the fuel cell A and the fuel cell B, the substitution ratio of cobalt ions in the electrolyte membrane 12 was configured to be 10%. FIG. 11 illustrates measurement results of the frequency characteristic of the AC impedance when different catalysts were used for the catalyst layer. In FIG. 11, the horizontal axis represents the frequency of the AC voltage, and the vertical axis represents the imaginary part value of the AC impedance. FIG. 11 reveals that when the fixed frequency of the AC voltage is 0.01 Hz or greater and 0.1 Hz or less, or 10 Hz or greater and 100 Hz or less, the difference in the imaginary part value of the AC impedance between the fuel cell A and the fuel cell B is small. That is, when the fixed frequency of the AC voltage is 0.01 Hz or greater and 0.1 Hz or less, or 10 Hz or greater and 100 Hz or less, the effect of the catalyst used for the catalyst layer is small. The reason why the effect of the catalyst is small when the fixed frequency of the AC voltage is within a range of 0.01 Hz or greater and 0.1 Hz or less is considered as follows. Since the imaginary part value of the AC impedance within the range of 0.01 Hz or greater and 0.1 Hz or less is due to the metal ions in the electrolyte membrane 12, when the content of the metal ions in the electrolyte membrane 12 is approximately the same, the imaginary part value of the AC impedance is approximately the same regardless of the type of the catalyst. From FIG. 11, to reduce the effect of the catalyst used for the catalyst layer to estimate the content of metal ions in the electrolyte membrane 12 with high accuracy, the fixed frequency of the AC voltage applied to the fuel cell 10 is preferably 0.01 Hz or greater and 0.1 Hz or less, or 10 Hz or greater and 100 Hz or less. The fixed frequency of the AC voltage applied to the fuel cell 10 is more preferably 0.02 Hz or greater and 0.08 Hz or less, or 20 Hz or greater and 80 Hz or less. The fixed frequency of the AC voltage applied to the fuel cell 10 is further preferably 0.03 Hz or greater and 0.05 Hz or less, or 30 Hz or greater and 60 Hz or less.

Figure 12:
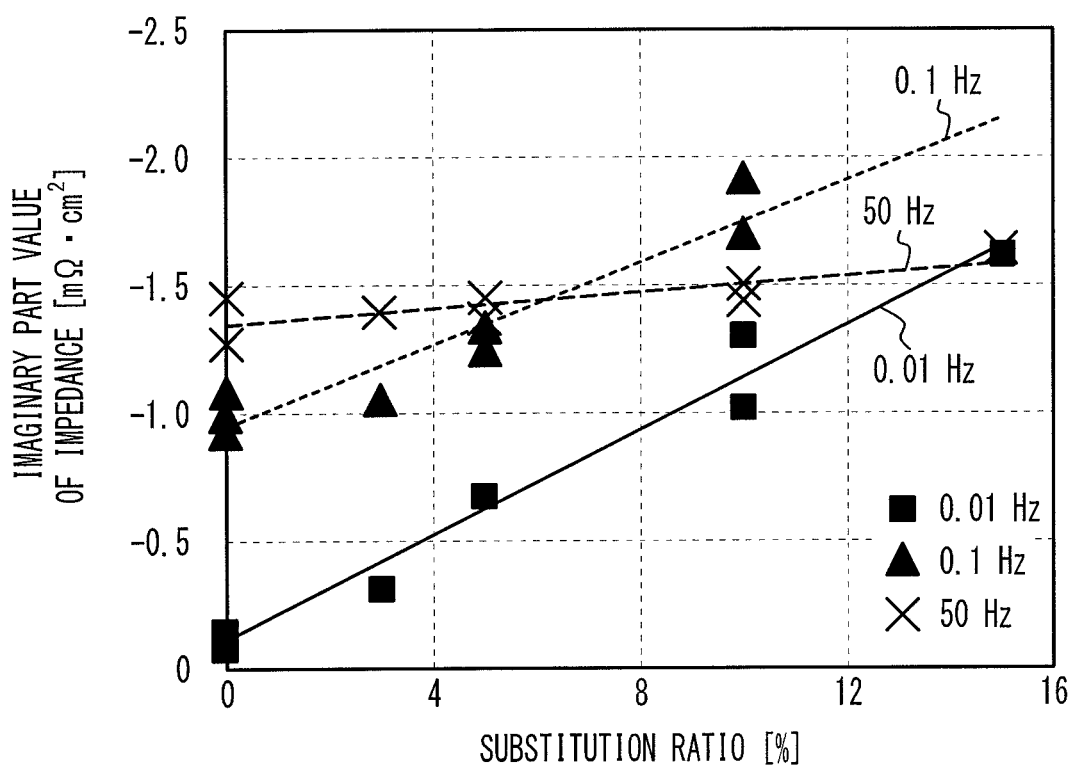
FIG. 12 is a diagram evaluating a relationship between the substitution ratio of metal ions in the electrolyte membrane and the imaginary part value of the alternating-current impedance when the fixed frequency of an alternating-current voltage was configured to be 0.01 Hz, 0.1 Hz, or 50 Hz.

In addition, to estimate the content of metal ions in the electrolyte membrane 12 with higher accuracy, the fixed frequency of the AC voltage applied to the fuel cell 10 is preferably 0.01 Hz or greater and 0.1 Hz or less. The reason will be described on the basis of the experiment conducted by the inventor. The inventor used the fuel cell A presented in Table 1, and evaluated the change in the imaginary part value of the AC impedance with respect to the substitution ratio of metal ions in the electrolyte membrane 12 when the fixed frequency of the AC voltage applied to the fuel cell A was configured to be 0.01 Hz, 0.1 Hz, or 50 Hz. FIG. 12 is a diagram evaluating the relationship between the substitution ratio of metal ions in the electrolyte membrane and the imaginary part value of the AC impedance when the fixed frequency of the AC voltage applied to the fuel cell was configured to be 0.01 Hz, 0.1 Hz, or 50 Hz. In FIG. 12, the horizontal axis represents the substitution ratio, and the vertical axis represents the imaginary part value of the AC impedance. As illustrated in FIG. 12, when the fixed frequency of the AC voltage applied to the fuel cell A is 0.1 Hz or 0.01 Hz, the imaginary part value of the AC impedance greatly changes in accordance with the change in substitution ratio of metal ions. On the other hand, when the fixed frequency of the AC voltage is 50 Hz, the amount of change in the imaginary part value of the AC impedance is small even when the substitution ratio of metal ions changes. Thus, to estimate the content of metal ions in the electrolyte membrane 12 with higher accuracy, the fixed frequency of the AC voltage applied to the fuel cell 10 is preferably 0.01 Hz or greater and 0.1 Hz or less, more preferably 0.01 Hz or greater and 0.08 Hz or less, further preferably 0.01 Hz or greater and 0.05 Hz or less.

In the first embodiment, the amplitude of the AC voltage applied to the fuel cell 10 is preferably 0.6 mV or greater and 100 mV or less. The amplitude does not mean a peak-to-peak amplitude, which is the difference between the upper limit and the lower limit in sine waves or the like, and means a zero-to-peak amplitude, which is the difference between the center of oscillation and the upper limit or the lower limit. Here, the reason why the amplitude of the AC voltage is preferably 0.6 mV or greater and 100 mV or less will be described on the basis of the experiment conducted by the inventor. The inventor measured the frequency characteristic of the AC impedance when the amplitude of the AC voltage was varied with use of the fuel cell A presented in Table 1.

Figure 13A:
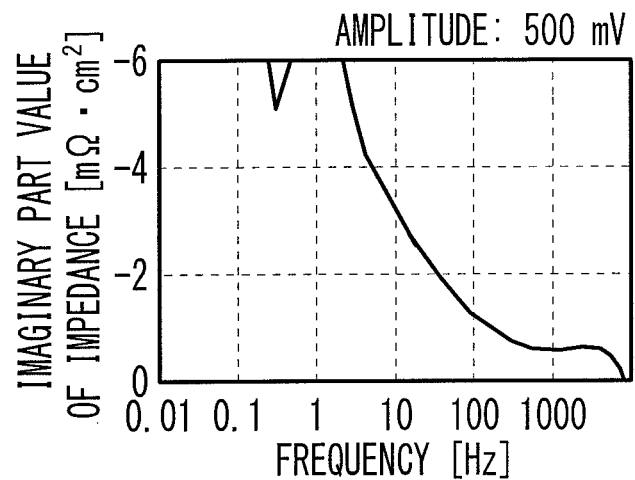
FIG. 13A through FIG. 13I illustrate measurement results of the frequency characteristic of the alternating-current impedance when the amplitude of the alternating-current voltage was varied.
Figure 13B:
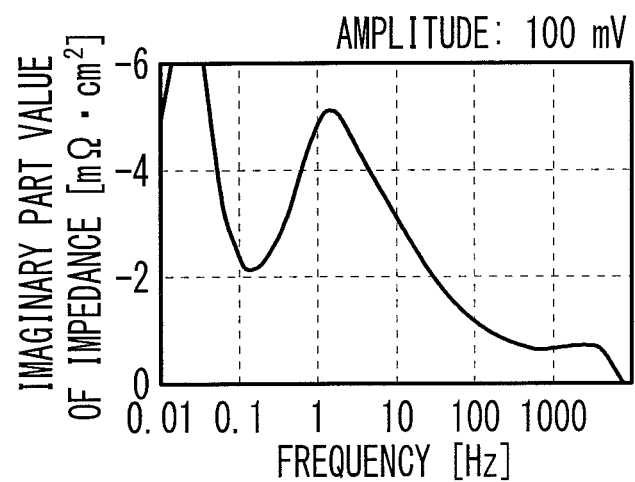
Figure 13C:
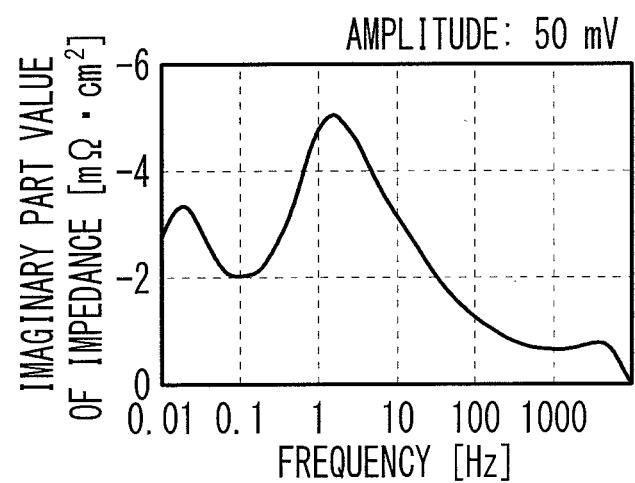
Figure 13D:
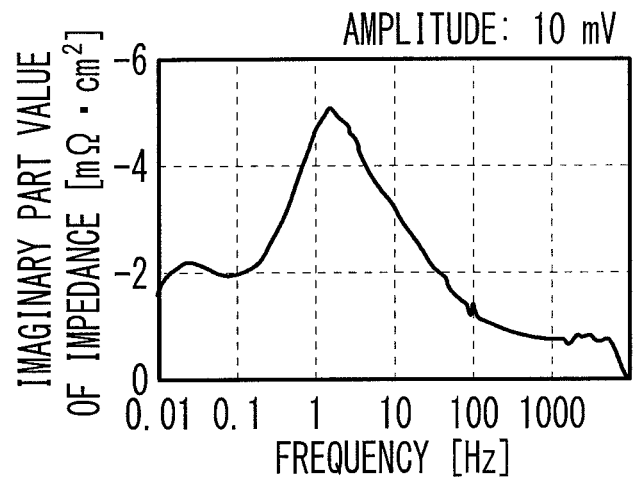
Figure 13E:
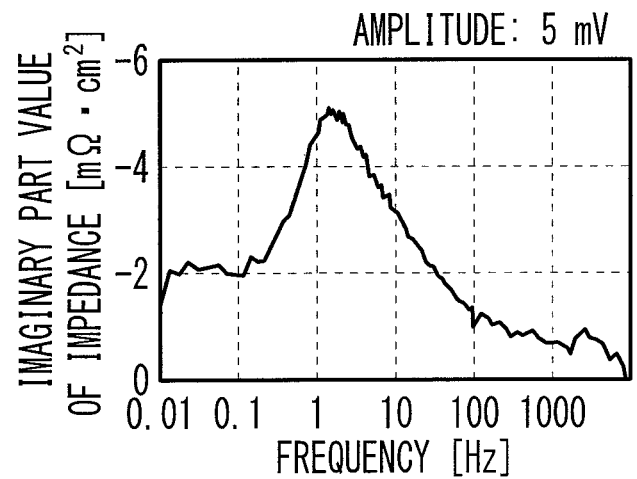
Figure 13F:
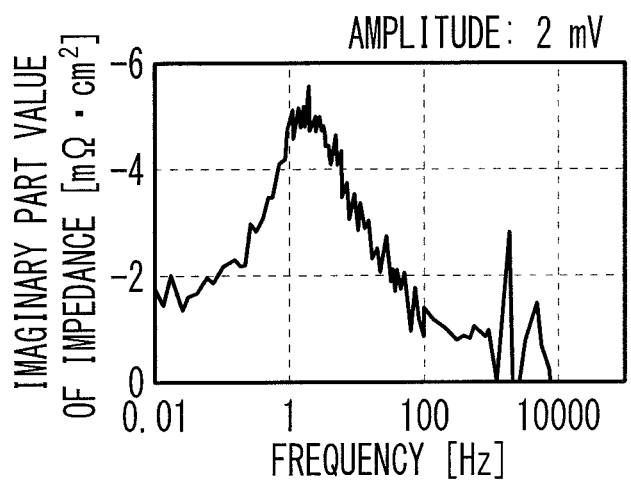
Figure 13G:
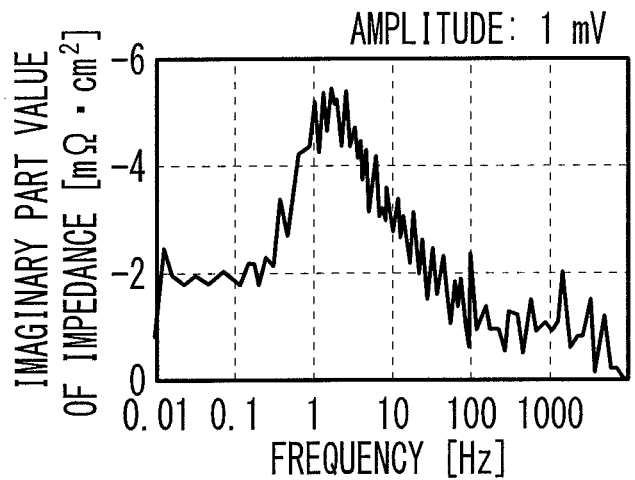
Figure 13H:
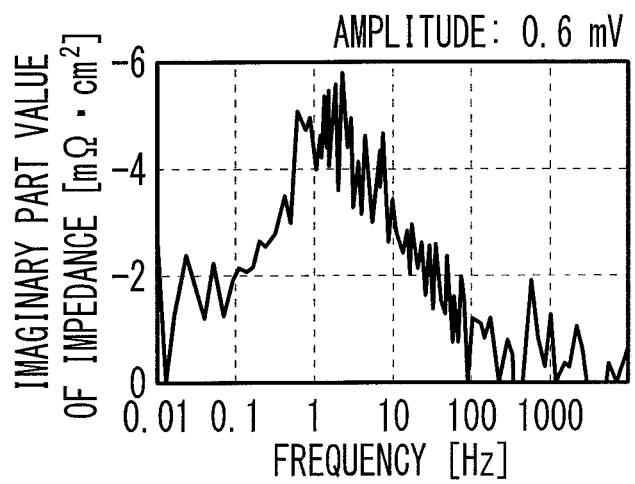
Figure 13I:
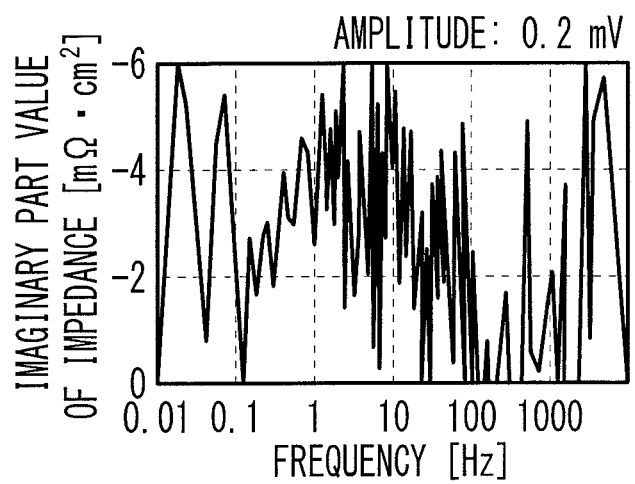

FIG. 13A through FIG. 13I illustrate measurement results of the frequency characteristic of the AC impedance when the amplitude of the AC voltage was varied. FIG. 13A illustrates measurement results when the amplitude of the AC voltage was 500 mV, FIG. 13B illustrates measurement results when the amplitude was 100 mV, FIG. 13C illustrates measurement results when the amplitude was 50 mV, and FIG. 13D illustrates measurement results when the amplitude was 10 mV. FIG. 13E illustrates measurement results when the amplitude was 5 mV, FIG. 13F illustrates measurement results when the amplitude was 2 mV, FIG. 13G illustrates measurement results when the amplitude was 1 mV, FIG. 13H illustrates measurement results when the amplitude was 0.6 mV, and FIG. 13I illustrates measurement results when the amplitude was 0.2 mV. In FIG. 13A through FIG. 13I, the horizontal axis represents the frequency of the AC voltage, and the vertical axis represents the imaginary part value of the AC impedance.

As illustrated in FIG. 13A through FIG. 13I, when the amplitude of the AC voltage is 0.2 mV, the measured waveform of the AC impedance is disturbed. Thus, it is difficult to estimate the content of metal ions from the imaginary part value of the AC impedance. On the other hand, when the amplitude of the AC voltage is 500 mV, the imaginary part value of the AC impedance at the fixed frequency of the AC voltage (e.g., a frequency of 0.2 Hz or less) used to estimate the content of metal ions is large. Thus, it becomes difficult to read the difference in the imaginary part value of the AC impedance due to the difference in content of metal ions. Thus, to measure the content of metal ions in the electrolyte membrane 12 with high accuracy, the amplitude of the AC voltage applied to the fuel cell 10 is preferably 0.6 mV or greater and 100 mV or less. The amplitude of the AC voltage applied to the fuel cell 10 is more preferably 1 mV or greater, further preferably 2 mV or greater. In addition, the amplitude of the AC voltage applied to the fuel cell 10 is more preferably 50 mV or less, further preferably 10 mV or less.

Figure 14:
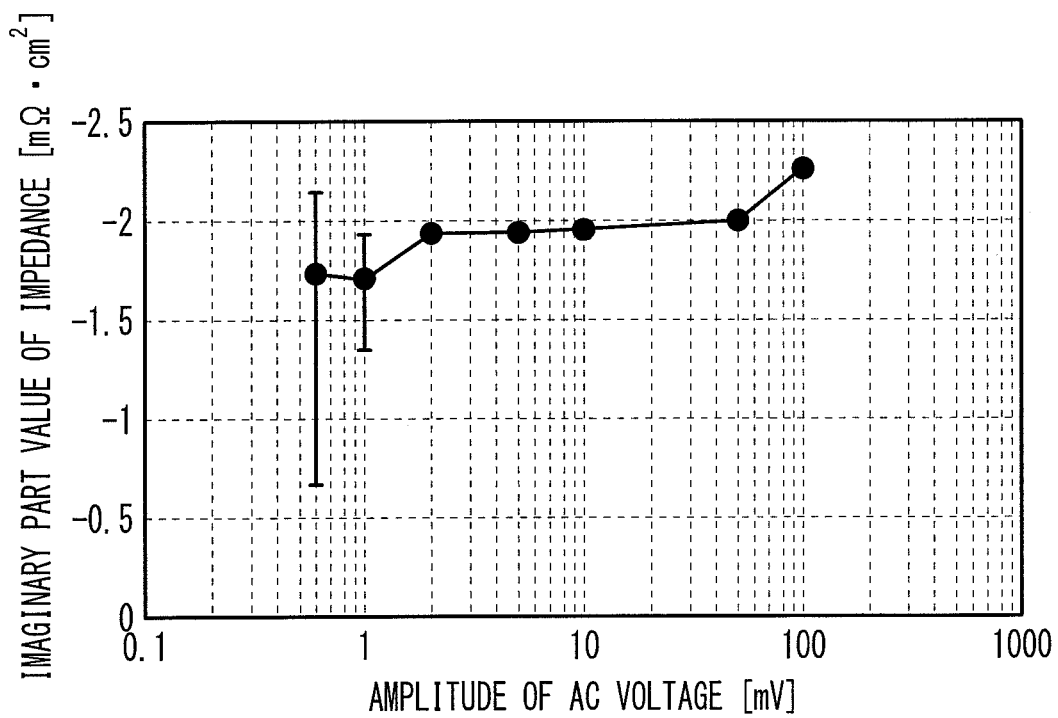
FIG. 14 is a diagram evaluating the variation in the imaginary part value of the alternating-current impedance with respect to the amplitude of the alternating-current voltage.

The AC impedance when the amplitude of the AC voltage was set at 100 my, 50 mV, 10 mV, 5 mV, 2 mV, 1 mV, or 0.6 mV was measured several times, and the variation in the measurement results of the imaginary part value of the AC impedance was evaluated. FIG. 14 is a diagram evaluating the variation in imaginary part value of the AC impedance with respect to the amplitude of the AC voltage. In FIG. 14, the horizontal axis represents the amplitude of the AC voltage, and the vertical axis represents the imaginary part value of the AC impedance when the frequency of the AC voltage is 0.1 Hz. In FIG. 14, the variation range of the measurement results is indicated by a solid line, and the average values are plotted with black circles. As illustrated in FIG. 14, when the amplitude of the AC voltage was 1 mV or less, the variation in the measurement results of the imaginary part value of the AC impedance was large. Thus, when the variation in the measurement results of the imaginary part value of the AC impedance is taken into consideration, the amplitude of the AC voltage is preferably 2 mV or greater and 100 mV or less.

Figure 15:
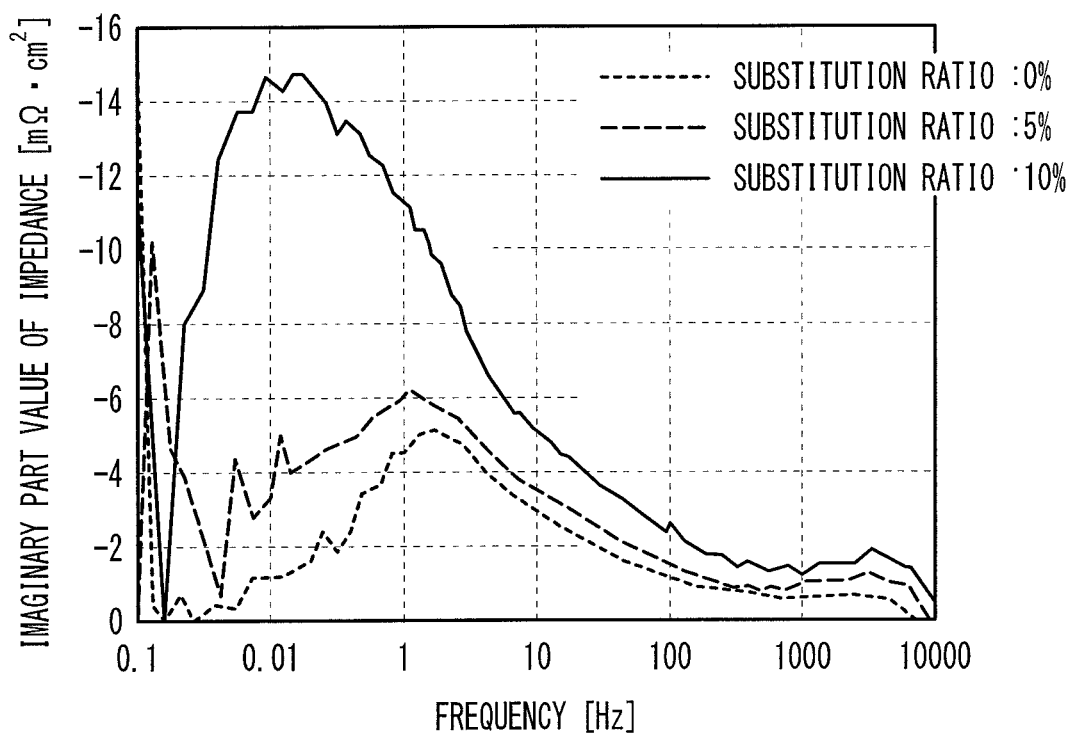
FIG. 15 illustrates measurement results of the frequency characteristic of the alternating-current impedance when an alternating-current voltage to which a bias voltage was added so that the alternating-current voltage oscillated around a voltage 100 mV greater than the open circuit voltage of the fuel cell was applied.

In the first embodiment, a bias voltage may be added to the AC voltage applied to the fuel cell 10. In this case, a bias voltage is preferably added so that the AC voltage oscillates around a voltage within the range of ±10 mV from the open circuit voltage of the fuel cell 10. The reason will be described on the basis of the experiment conducted by the inventor. The inventor measured the frequency characteristic of the AC impedance when the AC voltage to which a bias voltage was added so that the AC voltage oscillates around a voltage 100 mV greater than the open circuit voltage of the fuel cell was applied, with use of the fuel cell A presented in Table 1. The substitution ratio of cobalt ions in the electrolyte membrane 12 was configured to be 0%, 5%, or 10%. FIG. 15 illustrates measurement results of the frequency characteristic of the AC impedance when the AC voltage to which a bias voltage was added so that the AC voltage oscillates around a voltage 100 mV greater than the open circuit voltage of the fuel cell was applied. In FIG. 15, the horizontal axis represents the frequency of the AC voltage, and the vertical axis represents the imaginary part value of the AC impedance. Comparison between FIG. 3 and FIG. 15 reveals that when the AC voltage oscillating around a voltage 100 mV greater than the open circuit voltage is applied and the electrolyte membrane 12 contains metal ions, the change in the imaginary part value of the AC impedance is large.

Figure 16:
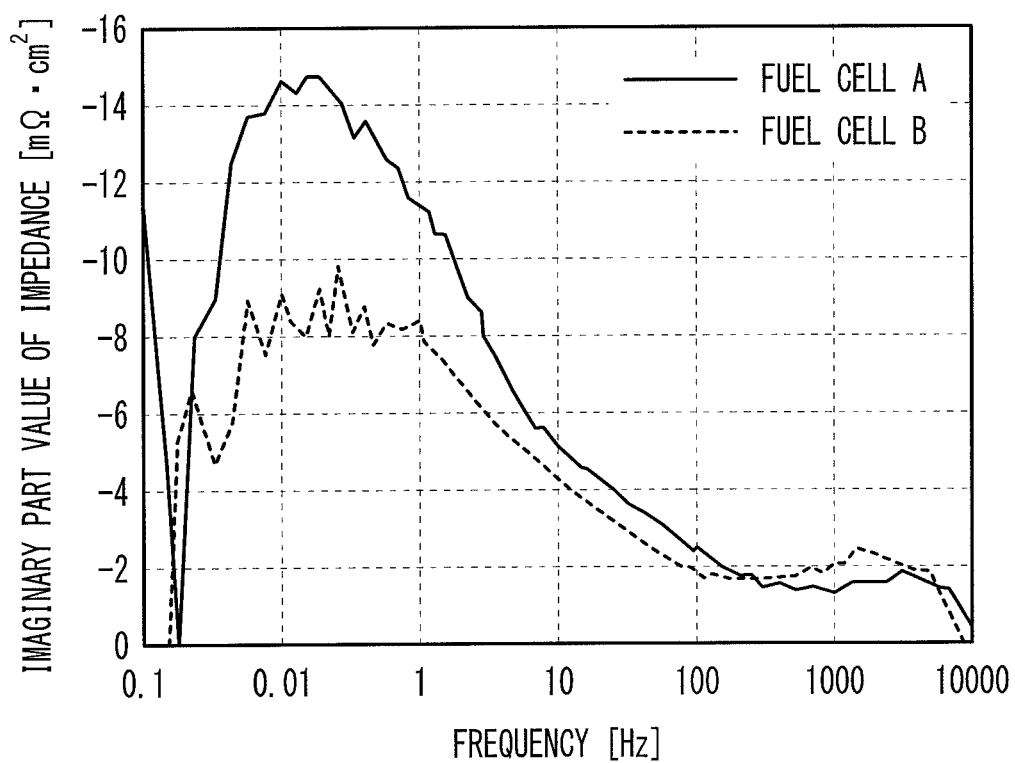
FIG. 16 illustrates measurement results of the frequency characteristic of the alternating-current impedance when an alternating-current voltage to which a bias voltage was added so that the alternating-current voltage oscillated around a voltage 100 mV greater than the open circuit voltage of the fuel cell was applied to the fuel cells with different catalysts.

Then, with use of the fuel cell A and the fuel cell B presented in Table 1, measured was the frequency characteristic of the AC impedance when the AC voltage to which a bias voltage was added so that the AC voltage oscillated around a voltage 100 mV greater than the open circuit voltage of the fuel cell was applied. In both the fuel cell A and the fuel cell B, the substitution ratio of cobalt ions in the electrolyte membrane 12 was configured to be 10%. FIG. 16 illustrates measurement results of the frequency characteristic of the AC impedance when the AC voltage to which a bias voltage was added so that the AC voltage oscillated around a voltage 100 mV greater than the open circuit voltage of the fuel cell was applied to fuel cells with different catalysts. In FIG. 16, the horizontal axis represents the frequency of the AC voltage, and the vertical axis represents the imaginary part value of the AC impedance. As in FIG. 11 described above, when the AC voltage oscillating around the open circuit voltage was used, the effect of the catalyst is reduced in a range of 0.01 Hz or greater and 0.1 Hz or less, or 10 Hz or greater and 100 Hz or less of the frequency of the AC voltage. On the other hand, as illustrated in FIG. 16, when the AC voltage oscillating around a voltage 100 mV greater than the open circuit voltage was applied, the effect of the catalyst was observed even in a range of 0.01 Hz or greater and 0.1 Hz or less, or 10 Hz or greater and 100 Hz or less of the frequency of the AC voltage. This is considered because the addition of a bias voltage caused the direct current to flow, and as a result, the metal ions in the MEA 14 were distributed more in the cathode catalyst layer 13c.

On the basis of the above described facts, the AC voltage applied to the fuel cell preferably oscillates around the open circuit voltage of the fuel cell. However, as clear from the experiment results of FIG. 13A through FIG. 13I, taking the fact that the imaginary part value of the AC impedance was appropriately measured even when the amplitude of the AC voltage was 10 mV into consideration, a bias voltage that causes the AC voltage applied to the fuel cell 10 to oscillate around a voltage within the range of ±10 mV from the open circuit voltage of the fuel cell 10 may be added to the AC voltage applied to the fuel cell 10, a bias voltage that causes the AC voltage applied to the fuel cell 10 to oscillate around a voltage within the range of ±5 mV from the open circuit voltage of the fuel cell 10 may be added to the AC voltage applied to the fuel cell 10, or a bias voltage that causes the AC voltage applied to the fuel cell 10 to oscillate around a voltage within the range of ±2 mV from the open circuit voltage of the fuel cell 10 may be added to the AC voltage applied to the fuel cell 10.

Figure 17:
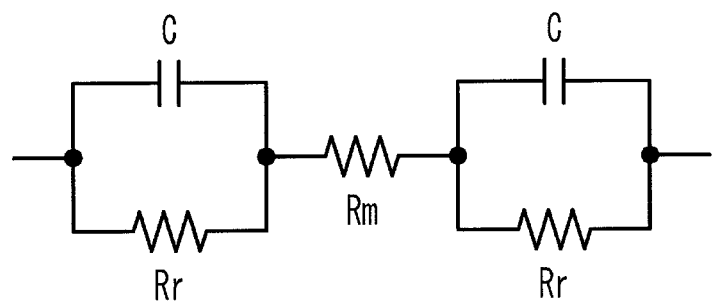
FIG. 17 is a circuit diagram for describing the impedance generated in the membrane-electrode assembly when an alternating-current voltage is applied to the fuel cell.

When nitrogen and hydrogen are present in the anode catalyst layer 13a and the cathode catalyst layer 13c, the ratio of the quantity of hydrogen to the sum of the quantities of nitrogen and hydrogen is preferably 2% or greater. The reason will be described hereinafter. In the following description, the ratio of the quantity of hydrogen to the sum of the quantities of nitrogen and hydrogen is expressed as a hydrogen concentration. FIG. 17 is a circuit diagram for describing the impedance generated in the membrane-electrode assembly when an AC voltage is applied to the fuel cell. As illustrated in FIG. 17, the anode catalyst layer 13a and the cathode catalyst layer 13c have a structure in which an electric double layer capacitor C and a reaction resistance $R_r$ are connected in parallel, and the electric double layer capacitor C and the reaction resistance $R_r$ are connected in series with a membrane resistance $R_m$ of the electrolyte membrane 12. The impedance Z of this circuit is $Z=(2R_r/i\omega CR_r+1)+R_m$. In addition, when the peak frequency at which the imaginary part value of the AC impedance has a local maximum value because of the reaction resistance is represented by $f_0$, $f_0=\omega/2\pi=1/2\pi R_r C$. Since the reaction resistance $R_r$ is inversely proportional to the hydrogen concentration $C_H$, $R_r=k/C_H$ (k: constant). Thus, the peak frequency $f_0$ is expressed by $f_0=C_H/2\pi kC$. Here, in FIG. 5 described above, the imaginary part value of the AC impedance has a peek between 1000 Hz and 10000 Hz of the frequency of the AC voltage. This peak is considered to be caused by the catalytic reaction. Thus, the peak frequency $f_0$ when the hydrogen concentration is 100% (i.e., $C_H=1$) can be configured to be, for example, 5000 Hz. In this case, $1/2\pi kC=f_0/C_H=5000$ Hz. Here, not to disturb the estimation of the content of metal ions from the imaginary part value of the AC impedance, the peak frequency $f_0$ at which the imaginary part value of the AC impedance has a local maximum value because of the reaction resistance is assumed to be $f_0 \geq 100$ Hz. Thus, $C_H \geq 0.02$ is derived from $f_0 \geq 100$ Hz and $f_0/C_H=5000$ Hz. As described above, when the ratio of the quantity of hydrogen to the sum of the quantities of nitrogen and hydrogen is configured to be 2% or greater, the peak frequency $f_0$ at which the imaginary part value of the AC impedance has a local maximum value because of the reaction resistance can be configured to be the frequency within the range that does not disturb the estimation of the content of metal ions from the imaginary part value of the AC impedance. Thus, the content of metal ions can be estimated from the imaginary part value of the AC impedance with high accuracy.

In the first embodiment, as described in FIG. 8, when stopping the power generation by the fuel cell 10, the control unit 80 closes the opening/closing valve 34 of the oxidant gas supply pipe 31 and the opening/closing valve 38 of the oxidant gas exhaust pipe 36 and maintains the supply of hydrogen to the anode catalyst layer 13a. Then, the control unit 80 estimates the content of metal ions in the electrolyte membrane 12 after a predetermined time passes from the closing of the opening/closing valve 34 and the opening/closing valve 38. This configuration allows the content of metal ions in the electrolyte membrane 12 to be estimated in the state where hydrogen is present and oxygen is absent in the anode catalyst layer 13a and the cathode catalyst layer 13c.

Second Embodiment

Figure 18:
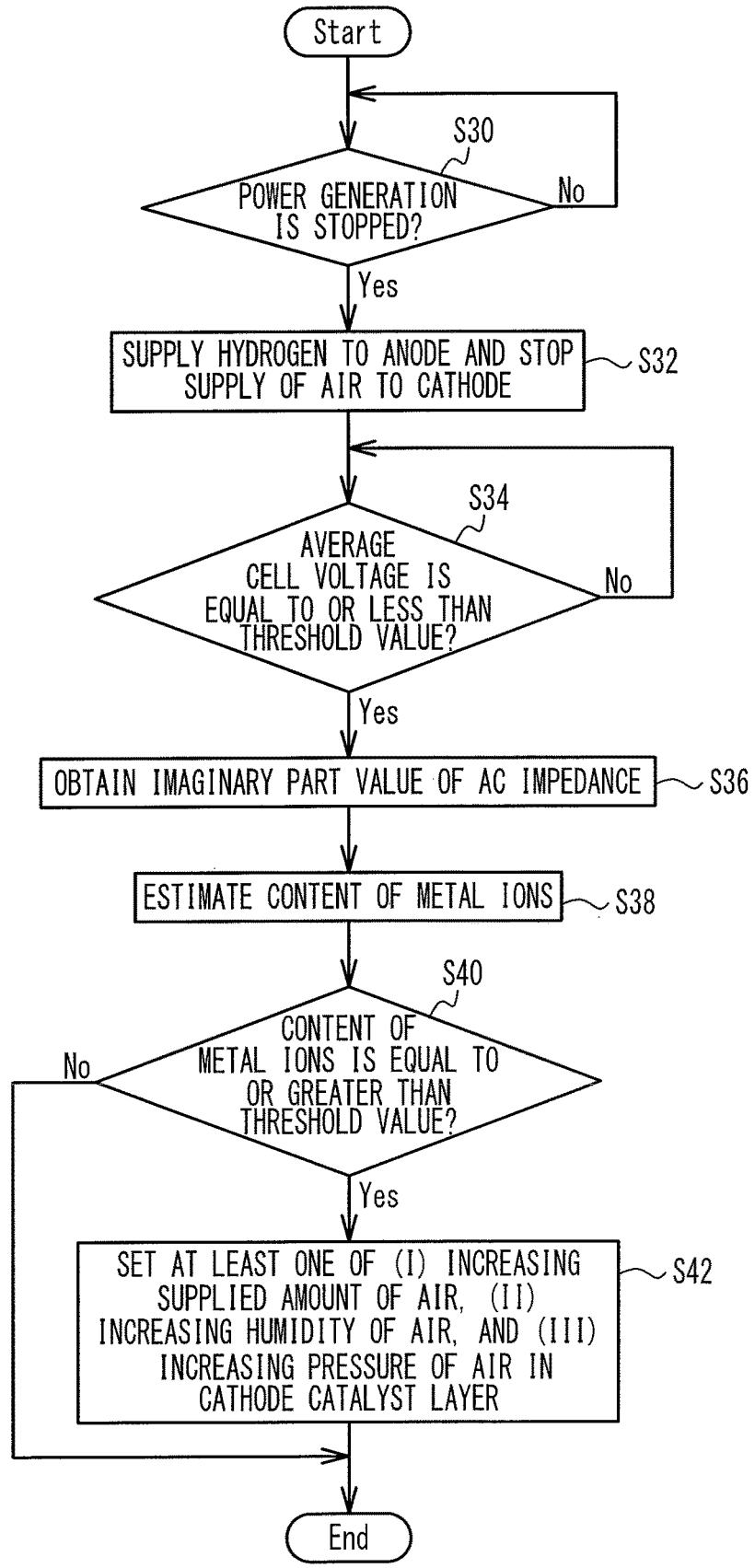
FIG. 18 is a flowchart illustrating a method of estimating the content of metal ions in a second embodiment.

The structure of a fuel cell system in accordance with a second embodiment is the same as that of the first embodiment illustrated in FIG. 1, and the description thereof is thus omitted. FIG. 18 is a flowchart illustrating a method of estimating the content of metal ions in the second embodiment. The process in FIG. 18 is executed by the impedance acquisition unit, the metal ion content estimation unit, the valve control unit, the gas control unit, and a setting unit that are programmed so as to be functionally implemented by the CPU, the RAM, the ROM, and the memory of the control unit 80.

Step S30 through step S38 of FIG. 18 are respectively the same as step S10 through step S18 of the first embodiment in FIG. 8, and the description thereof is thus omitted. After the content of metal ions is estimated at step S38, the control unit 80 determines whether the estimated content of metal ions is equal to or greater than a threshold value (for example, 10 μg/cm$^2$) (step S40). When the estimated content of metal ions is less than the threshold value (step S40: No), the control unit 80 ends the process. On the other hand, when the content of metal ions is equal to or greater than the threshold value (step S40: Yes), the control unit 80 conducts a setting for executing at least one of (i) when and after the fuel cell 10 is started next time, configuring the amount of air supplied to the cathode catalyst layer 13c to be greater than that when the content of metal ions is less than the threshold value, (ii) when and after the fuel cell 10 is started next time, configuring the humidity of air supplied to the cathode catalyst layer 13c to be higher than that when the content of metal ions is less than the threshold value, and (iii) when and after the fuel cell 10 is started next time, configuring the pressure of air in the cathode catalyst layer 13c to be higher than that when the content of metal ions is less than the threshold value (step S42). The supplied amount of air can be adjusted by the air compressor 32, the humidity of air can be adjusted by the humidifying module 35, and the pressure of air can be adjusted by the regulating valve 37. For example, for the above (i), when the content of metal ions is less than the threshold value, the ratio of the air supply amount to the theoretical amount of air necessary for an electrochemical reaction is 1.5, while when the content of metal ions is equal to or greater than the threshold value, the ratio of the air supply amount to the theoretical amount of air necessary for an electrochemical reaction may be configured to be 1.8. For above (ii), when the content of metal ions is less than the threshold value, the humidity of air supplied to the cathode catalyst layer 13c is 30%, while when the content of metal ions is equal to or greater than the threshold value, the humidity of air supplied to the cathode catalyst layer 13c may be configured to be 50%. For above (iii), when the content of metal ions is less than the threshold value, the pressure of air in the cathode catalyst layer 13c is 130 kPa, while when the content of metal ions is equal to or greater than the threshold value, the pressure of air in the cathode catalyst layer 13c may be configured to be 150 kPa.

In the second embodiment, when and after the fuel cell 10 is started next time, even when the content of metal ions in the electrolyte membrane 12 is large and thereby, the power generation performance is likely to decrease, the decrease in power generation performance is inhibited.

On the basis of the estimated value of the content of metal ions in the electrolyte membrane 12, the price of the fuel cell vehicle on which the fuel cell system is installed can be valued, or metal ions in the fuel cell 10 can be cleaned.

Third Embodiment

Figure 19:
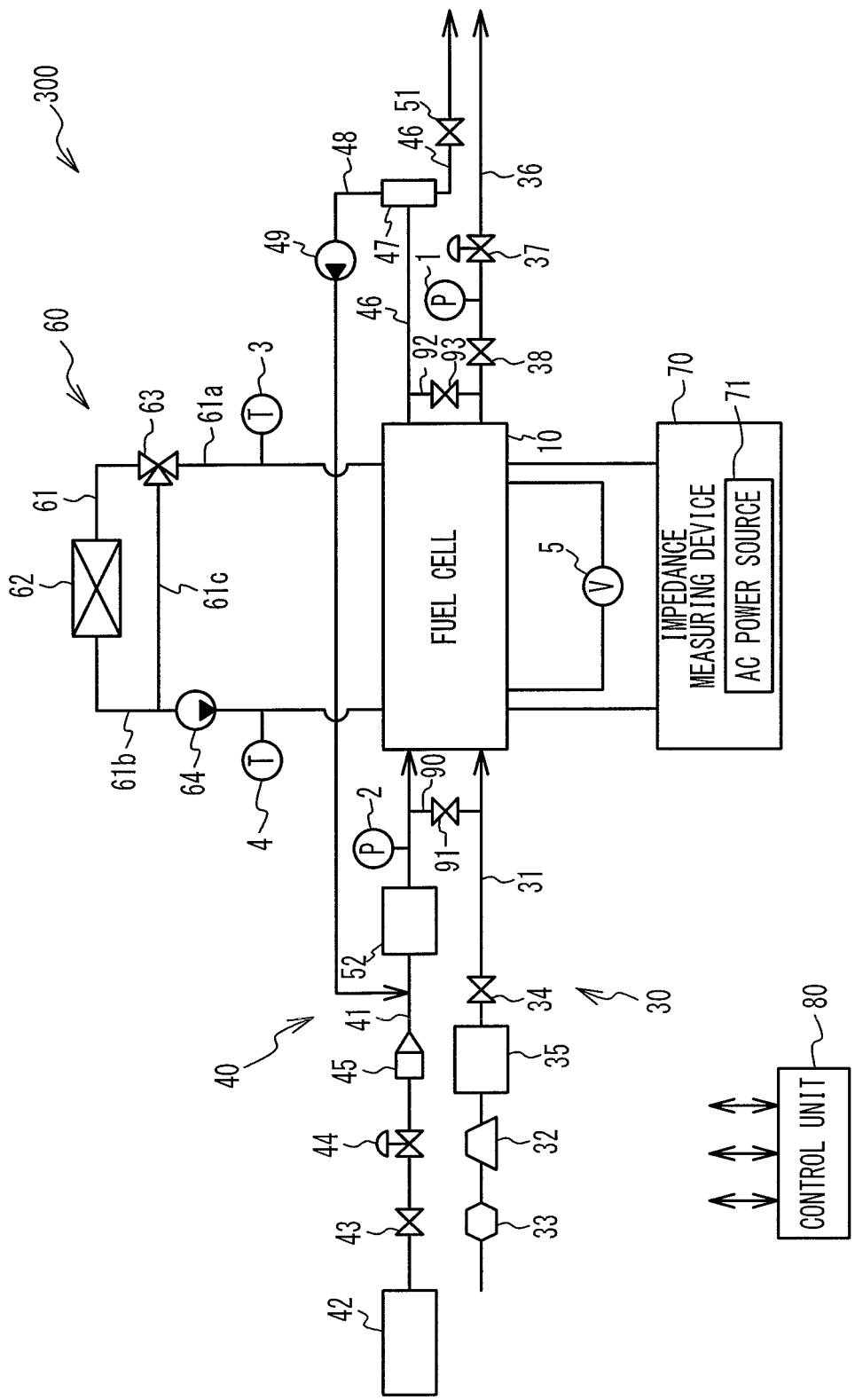
FIG. 19 is a schematic diagram illustrating a structure of a fuel cell system in accordance with a third embodiment.

FIG. 19 is a schematic diagram illustrating a structure of a fuel cell system in accordance with a third embodiment. As illustrated in FIG. 19, a fuel cell system 300 includes a humidifying module 52 in the fuel gas supply pipe 41. In addition, the fuel cell system 300 includes a supply connection pipe 90 connecting the oxidant gas supply pipe 31 and the fuel gas supply pipe 41, and an exhaust connection pipe 92 connecting the oxidant gas exhaust pipe 36 and the fuel gas exhaust pipe 46. An opening/closing valve 91, which is, for example, an electromagnetic valve, is located in the supply connection pipe 90, and an opening/closing valve 93, which is, for example, an electromagnetic valve, is located in the exhaust connection pipe 92. The opening/closing valve 91 and the opening/closing valve 93 open and close in accordance with the instruction from the control unit 80, and control the supply of hydrogen from the hydrogen tank 42 to the cathode catalyst layer 13c. Other structures are the same as those of the first embodiment illustrated in FIG. 1, and the description thereof is thus omitted.

Figure 20:
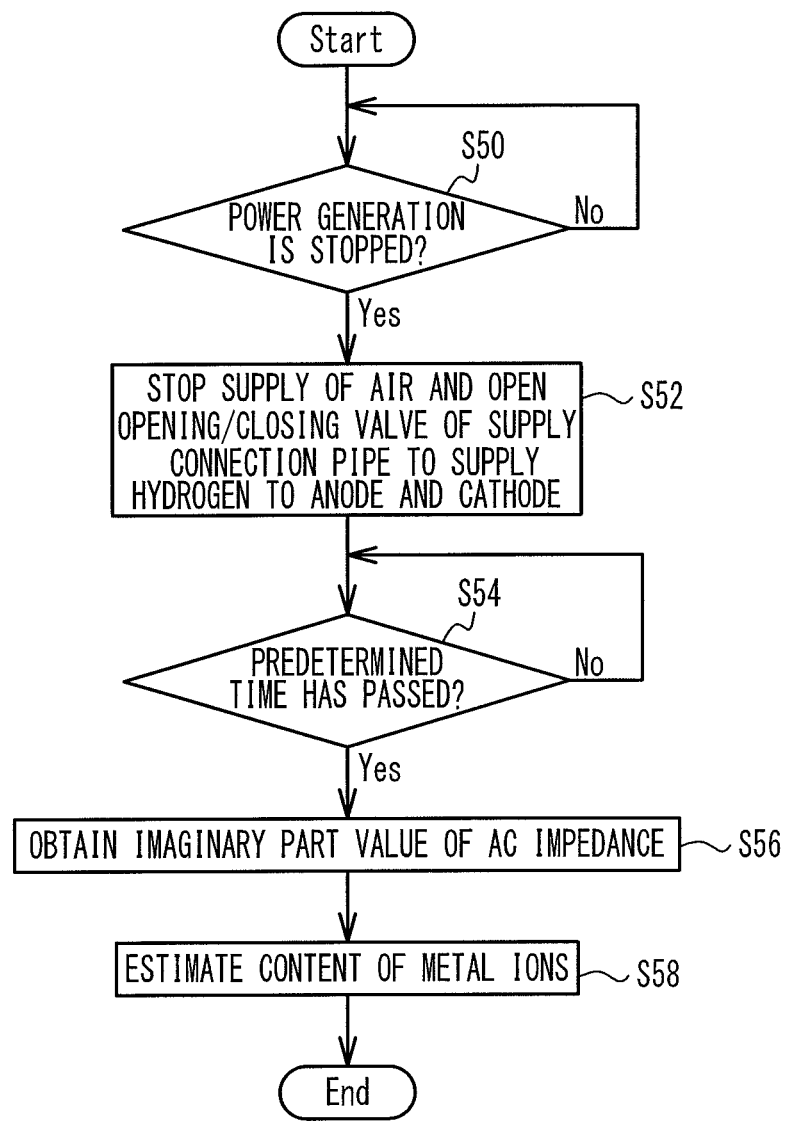
FIG. 20 is a flowchart illustrating a method of estimating the content of metal ions in the third embodiment.

FIG. 20 is a flowchart illustrating a method of estimating the content of metal ions in the third embodiment. The process in FIG. 20 is executed by the impedance acquisition unit, the metal ion content estimation unit, the valve control unit, and the gas control unit that are programmed so as to be functionally implemented by the CPU, the RAM, the ROM, and the memory of the control unit 80. As illustrated in FIG. 20, the control unit 80 waits until the control unit 80 detects the ignition-off signal that stops power generation by the fuel cell 10 (step S50). During the power generation by the fuel cell 10, the opening/closing valve 91 of the supply connection pipe 90 and the opening/closing valve 93 of the exhaust connection pipe 92 are closed.

After detecting the ignition-off signal (step S50: Yes), the control unit 80 closes the opening/closing valve 34 of the oxidant gas supply pipe 31 and the opening/closing valve 38 of the oxidant gas exhaust pipe 36 to stop the supply of air to the cathode catalyst layer 13c, and opens the opening/closing valve 91 of the supply connection pipe 90 and the opening/closing valve 93 of the exhaust connection pipe 92 to supply hydrogen to the anode catalyst layer 13a and the cathode catalyst layer 13c (step S52). Since the humidifying module 52 is located in the fuel gas supply pipe 41, the relative humidity of the MEA 14 is easily adjusted to a desired humidity equal to or greater than 20% RH by controlling the degree of humidification with use of the humidifying module 52 and supplying the humidified hydrogen to the anode catalyst layer 13a and the cathode catalyst layer 13c.

Then, the control unit 80 waits until a predetermined time (e.g., 10 seconds) passes after the opening of the opening/closing valve 91 and the opening/closing valve 93 to supply hydrogen to the anode catalyst layer 13a and the cathode catalyst layer 13c (step S54). The predetermined time can be a time until the oxidant gas contained in the cathode catalyst layer 13c is substituted by hydrogen supplied to the anode catalyst layer 13a and the cathode catalyst layer 13c and the oxidant gas is thereby practically absent in the cathode catalyst layer 13c.

After the predetermined time passes (step S54: Yes), the control unit 80 controls the impedance measuring device 70 to obtain the imaginary part value of the AC impedance of the fuel cell 10 (step S56). The imaginary part value of the AC impedance is obtained by the same method as the first embodiment, and the description thereof is thus omitted.

Then, the control unit 80 estimates the content of metal ions in the electrolyte membrane 12 on the basis of the imaginary part value of the AC impedance obtained at step S56 (step S58). The content of metal ions is estimated by the same method as the first embodiment, and the description thereof is thus omitted.

In the third embodiment, the supply connection pipe 90 connecting the oxidant gas supply pipe 31 and the fuel gas supply pipe 41 and the opening/closing valve 91 located in the supply connection pipe 90 are provided. During the stoppage of the power generation by the fuel cell 10, the control unit 80 stops the supply of air and opens the opening/closing valve 91 to supply hydrogen to the anode catalyst layer 13a and the cathode catalyst layer 13c, and estimates the content of metal ions in the electrolyte membrane 12 after a predetermined time passes from the opening of the opening/closing valve 91. This configuration allows the content of metal ions in the electrolyte membrane 12 to be estimated in the state where hydrogen is present and oxygen is absent in the anode catalyst layer 13a and the cathode catalyst layer 13c.

Fourth Embodiment

As in FIG. 6A and FIG. 6B described above, the frequency characteristic of the imaginary part value of the AC impedance changes in accordance with the thickness of the electrolyte membrane 12, and when the electrolyte membrane 12 is thin, the frequency is higher than that when the electrolyte membrane 12 is thick. Thus, when the content of metal ions is estimated from the imaginary part value of the AC impedance, the fixed frequency of the AC voltage applied to the fuel cell 10 is preferably changed in accordance with the thickness of the electrolyte membrane 12. The thickness of the electrolyte membrane 12 may be gradually thinned because of age deterioration. Thus, a fourth embodiment changes the fixed frequency of the AC voltage applied to the fuel cell 10 in accordance with the thickness of the electrolyte membrane 12. The structure of a fuel cell system in accordance with the fourth embodiment is the same as that of the first embodiment illustrated in FIG. 1, and the description thereof is thus omitted.

Figure 21:
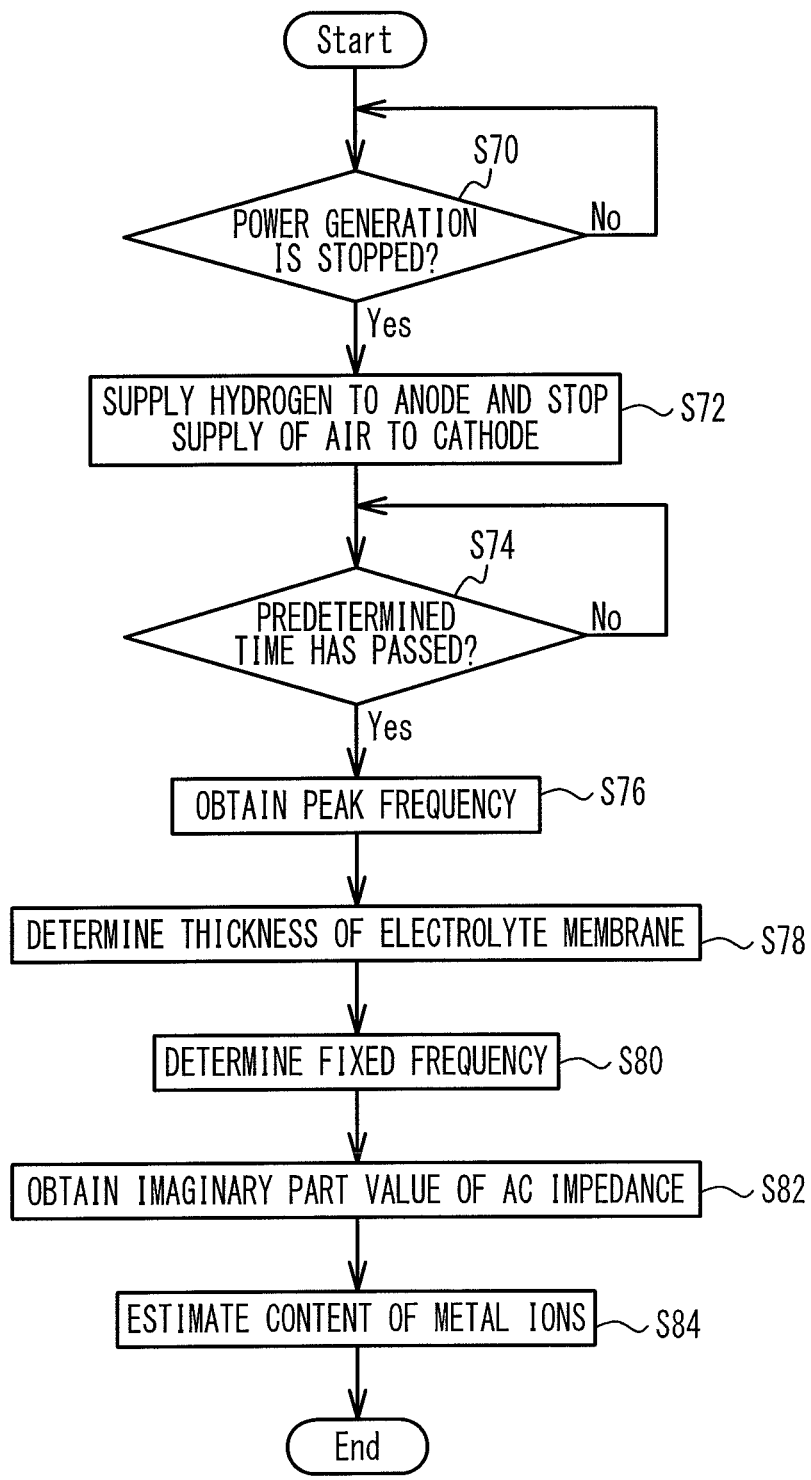
FIG. 21 is a flowchart illustrating a method of estimating the content of metal ions in a fourth embodiment.

FIG. 21 is a flowchart illustrating a method of estimating the content of metal ions in accordance with the fourth embodiment. The process in FIG. 21 is executed by the impedance acquisition unit, the metal ion content estimation unit, the valve control unit, the gas control unit, a peak frequency determination unit, a thickness determination unit, and a fixed frequency determination unit that are programmed so as to be functionally implemented by the CPU, the RAM, the ROM, and the memory of the control unit 80. As illustrated in FIG. 21, the control unit 80 waits until the control unit 80 detects the ignition-off signal that stops the power generation by the fuel cell 10 (step S70). After detecting the ignition-off signal (step S70: Yes), the control unit 80 maintains the supply of hydrogen to the anode catalyst layer 13a and stops the supply of air to the cathode catalyst layer 13c (step S72). Thereafter, the control unit 80 waits until a predetermined time passes (step S74). This configuration established the state where the relative humidity of the MEA 14 is 20% RH or greater and hydrogen is present and oxygen is absent in the anode catalyst layer 13a and the cathode catalyst layer 13c as described in the first embodiment.

Figure 22:
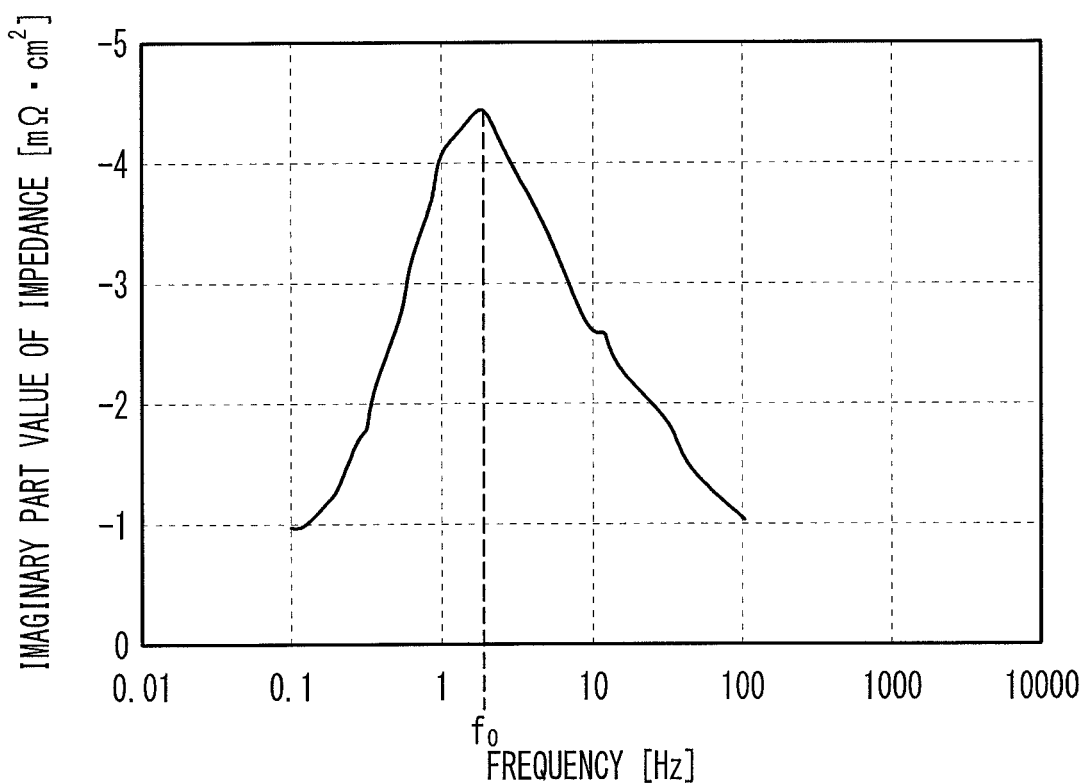
FIG. 22 illustrates measurement results of the frequency characteristic of the alternating-current impedance when the frequency of the alternating-current voltage was swept between 0.1 Hz and 100 Hz.

Then, after the predetermined time passes (step S74: Yes), the control unit 80 controls the impedance measuring device 70 to sweep the frequency of the AC voltage applied to the fuel cell 10 and measure the AC impedance, and obtains the peak frequency at which the imaginary part value of the AC impedance has a local maximum value (step S76). For example, when the impedance measuring device 70 sweeps the frequency of the AC voltage between 0.1 Hz and 100 Hz, and then measures the AC impedance, the frequency characteristic of the AC impedance such as that illustrated in FIG. 22 is obtained. In FIG. 22, the horizontal axis represents the frequency of the AC voltage, and the vertical axis represents the imaginary part value of the AC impedance. Accordingly, the control unit 80 obtains the peak frequency $f_0$ at which the imaginary part value of the AC impedance has a local maximum value.

Figure 23:
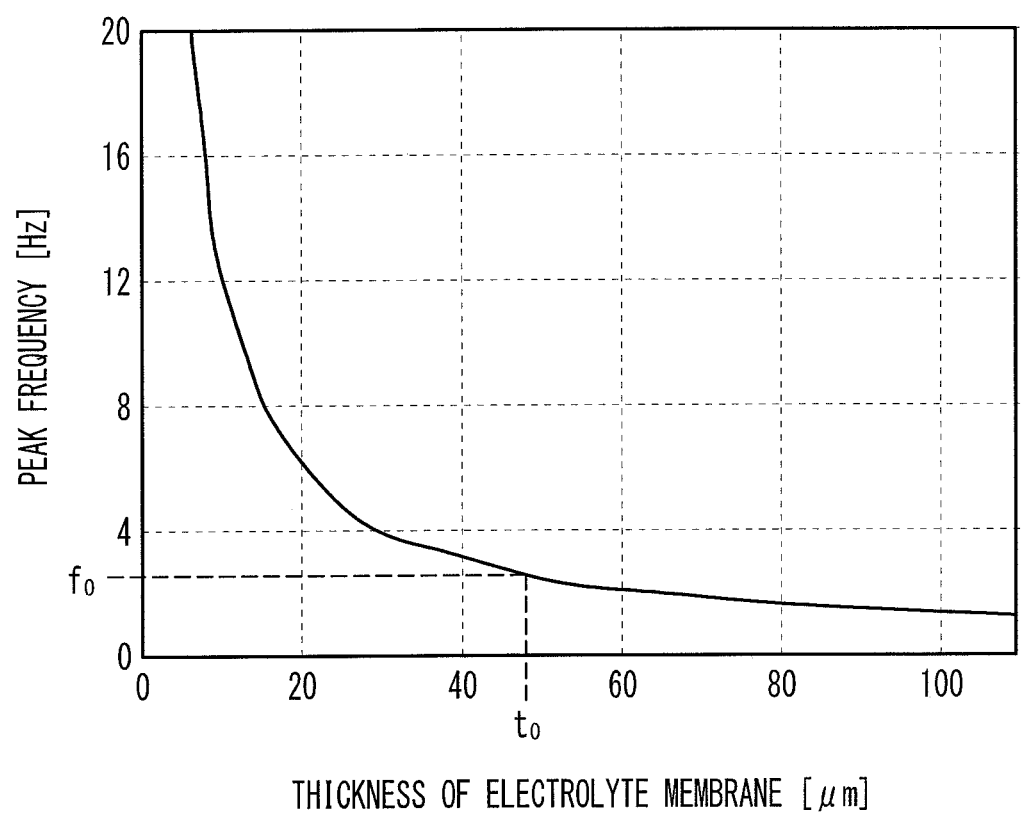
FIG. 23 illustrates a relationship between the thickness of the electrolyte membrane and the peak frequency at which the imaginary part value of the alternating-current impedance has a local maximum value.

Then, the control unit 80 determines the thickness to of the electrolyte membrane 12 from the peak frequency $f_0$ obtained at step S76 (step S78). For example, the memory of the control unit 80 stores a map showing the relationship between the thickness of the electrolyte membrane 12 and the peak frequency at which the imaginary part value of the AC impedance has a local maximum value illustrated in FIG. 23. The control unit 80 refers to the map stored in the memory such as the map illustrated in FIG. 23, and determines the thickness to of the electrolyte membrane 12 from the peak frequency $f_0$ obtained at step S76.

Then, the control unit 80 determines the fixed frequency $f_1$ used for measurement from the thickness to of the electrolyte membrane 12 determined at step S78 (step S80). For example, the control unit 80 determines the fixed frequency $f_1$ that satisfies (Fixed frequency)×(Thickness of the electrolyte membrane)$^2$≤500 [Hz·μm$^2$]. For example, the fixed frequency $f_1$ is determined from $f_1 \times t_0^2 = 250$ so that (Fixed frequency)×(Thickness of the electrolyte membrane)$^2$=250 [Hz·μm$^2$] is satisfied.

Then, the control unit 80 controls the impedance measuring device 70 to apply an AC voltage with the fixed frequency $f_1$ determined at step S80 to the fuel cell 10, and obtains the imaginary part value of the AC impedance of the fuel cell 10 (step S82). The imaginary part value of the AC impedance is obtained by the same method as the first embodiment, and the description thereof is thus omitted.

Then, the control unit 80 estimates the content of metal ions in the electrolyte membrane 12 from the imaginary part value of the AC impedance obtained at step S82 (step S84). The content of metal ions is estimated by the same method as the first embodiment, and the description thereof is thus omitted.

Figure 24:
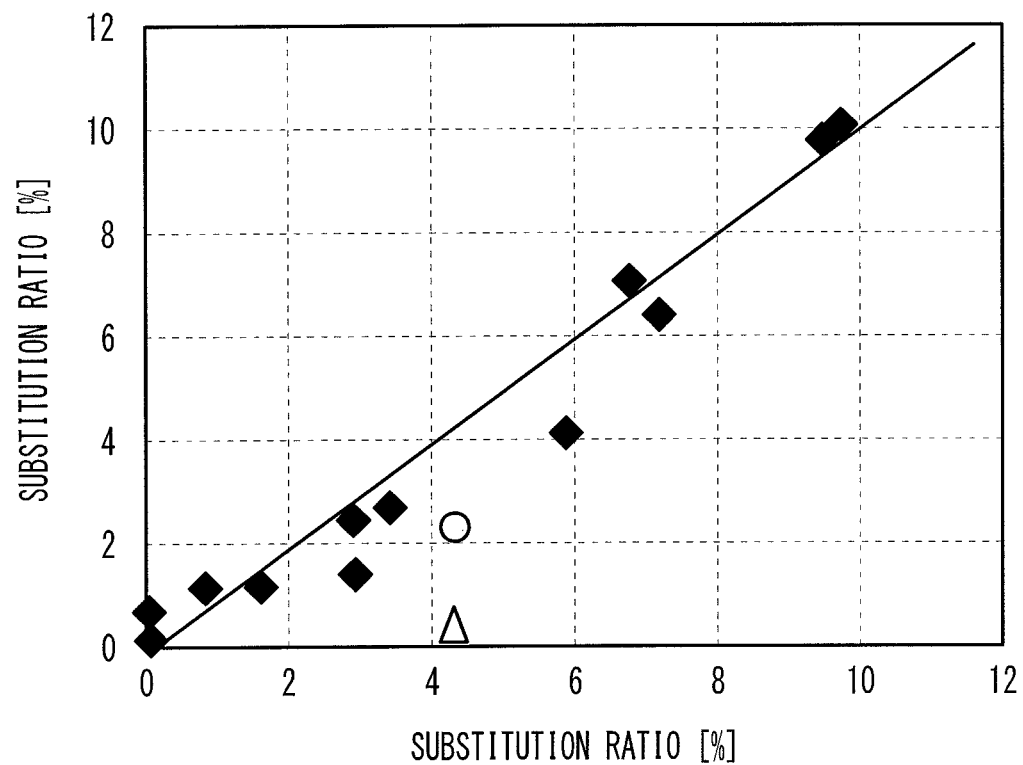
FIG. 24 is a diagram for describing the advantage of the method of estimating the content of metal ions in accordance with the fourth embodiment.

FIG. 24 is a diagram for describing the advantage of the estimation method of the content of metal ions in accordance with the fourth embodiment. In FIG. 24, the horizontal axis represents the substitution ratio of metal ions in the electrolyte membrane 12 measured by inductively coupled plasma mass spectrometry (ICP-MS). The vertical axis represents the substitution ratio of metal ions in the electrolyte membrane 12 estimated from the imaginary part value of the AC impedance. Diamonds indicate results of measurement performed on fuel cells with use of ICP-MS. The electrolyte membranes 12 of the fuel cells had the same thickness, which is a first thickness. The substitution ratio of metal ions in the electrolyte membranes 12 of the fuel cells were different from each other. In addition, circles and triangles indicate results of measurement performed on fuel cells of which the electrolyte membrane 12 had a second thickness thinner than the first thickness by using the imaginary part value of the AC impedance. The circle indicates the measurement results when the fixed frequency of the AC voltage applied to the fuel cell 10 was adjusted in accordance with the thickness of the electrolyte membrane 12, and the triangle indicates the measurement results when the fixed frequency of the AC voltage applied to the fuel cell 10 was not adjusted. FIG. 24 reveals that by adjusting the fixed frequency of the AC voltage applied to the fuel cell 10 in accordance with the thickness of the electrolyte membrane 12, the substitution ratio of metal ions obtained from the imaginary part value of the AC impedance becomes closer to the substitution ratio of metal ions measured by ICP-MS, and the substitution ratio of metal ions is well estimated.

In the fourth embodiment, the control unit 80 applies an AC voltage of which the frequency is swept to the fuel cell 10, and determines the peak frequency at which the imaginary part value of the AC impedance has a local maximum value. The control unit 80 determines the thickness of the electrolyte membrane 12 from the determined peak frequency. The control unit 80 determines the fixed frequency of the AC voltage to be applied to the fuel cell 10 from the determined thickness of the electrolyte membrane 12. Then, the control unit 80 obtains the imaginary part value of the AC impedance when the AC voltage with the determined fixed frequency is applied to the fuel cell, and estimates the content of metal ions in the electrolyte membrane 12 from the imaginary part value of the AC impedance. This configuration allows the imaginary part value of the AC impedance when an AC voltage with a fixed frequency appropriate to the thickness of the electrolyte membrane 12 is applied to the fuel cell 10, and thereby, the content of metal ions is estimated with higher accuracy.

The first through fourth embodiments have described a case where the control unit 80 of the fuel cell system 100 installed on the fuel cell vehicle estimates the content of metal ions in the electrolyte membrane 12, but do not intend to suggest any limitation. A controller not installed on the fuel cell vehicle may estimate the content of metal ions in the electrolyte membrane 12 of the fuel cell 10 mounted on the fuel cell vehicle.

Although some embodiments of the present disclosure have been described in detail, the present disclosure is not limited to the specific embodiments but may be varied or changed within the scope of the present disclosure as claimed.

What is claimed is:

1. A fuel cell system comprising:
    a fuel cell that includes a membrane-electrode assembly, the membrane-electrode assembly including an electrolyte membrane, and an anode catalyst layer and a cathode catalyst layer sandwiching the electrolyte membrane;
    an impedance measuring device that measures alternating-current impedance of the fuel cell when an alternating-current voltage is applied to the fuel cell;
    an impedance acquisition unit configured to obtain a first imaginary part value of the alternating-current impedance of the fuel cell measured by the impedance measuring device when an alternating-current voltage with a fixed frequency satisfying Fixed frequency [Hz]×(Thickness of the electrolyte membrane [μm])$^2$≤500 [Hz×μm$^2$]

is applied to the fuel cell in a state where a relative humidity of the membrane-electrode assembly is 20% or greater, and a fuel gas is present and an oxidant gas is absent in the anode catalyst layer and the cathode catalyst layer; and
    a metal ion estimation unit configured to estimate a content of metal ions in the electrolyte membrane on a basis of the first imaginary part value of the alternating-current impedance obtained by the impedance acquisition unit.

2. The fuel cell system according to claim 1, wherein the metal ion estimation unit is configured to, when the first imaginary part value of the alternating-current impedance is large, estimate that the content of the metal ions in the electrolyte membrane is greater than that when the first imaginary part value of the alternating-current impedance is small.

3. The fuel cell system according to claim 1, wherein the metal ion estimation unit is configured to estimate the content of the metal ions in the electrolyte membrane on a basis of a third imaginary part value of alternating-current impedance calculated by subtracting a second imaginary part value of alternating-current impedance measured by applying the alternating-current voltage with the fixed frequency to the fuel cell when no metal ion is contained in the electrolyte membrane from the first imaginary part value of the alternating-current impedance.

4. The fuel cell system according to claim 1, wherein the alternating-current voltage with the fixed frequency applied to the fuel cell oscillates around a voltage within a range of ±10 mV from an open circuit voltage of the fuel cell.

5. The fuel cell system according to claim 1, wherein the alternating-current voltage with the fixed frequency applied to the fuel cell has an amplitude of 0.6 mV or greater and 100 mV or less.

6. The fuel cell system according to claim 1, wherein the impedance acquisition unit is configured to obtain the first imaginary part value of the alternating-current impedance when the alternating-current voltage with the fixed frequency is applied to the fuel cell in a state where the relative humidity of the membrane-electrode assembly is 45% or greater, and the fuel gas is present and the oxidant gas is absent in the anode catalyst layer and the cathode catalyst layer.

7. The fuel cell system according to claim 1, wherein the fixed frequency is 0.01 Hz or greater and 0.1 Hz or less, or 10 Hz or greater and 100 Hz or less.

8. The fuel cell system according to claim 1, wherein the impedance acquisition unit is configured to obtain the first imaginary part value of the alternating-current impedance when the alternating-current voltage with the fixed frequency further satisfying 10 [Hz×μm$^2$]≤Fixed frequency [Hz]×(Thickness of the electrolyte membrane [μm])$^2$≤500 [Hz×μm$^2$]

is applied to the fuel cell.

9. The fuel cell system according to claim 1, wherein when nitrogen and hydrogen that is the fuel gas are present in the anode catalyst layer and the cathode catalyst layer, a ratio of a quantity of hydrogen to a sum of quantities of nitrogen and hydrogen is 2% or greater.

10. The fuel cell system according to claim 1, further comprising:
    a first valve that is located further downstream than a compressor located in an oxidant gas supply pipe that supplies the oxidant gas to the cathode catalyst layer;
    a second valve that is located in an oxidant gas exhaust pipe that discharges the oxidant gas from the cathode catalyst layer;
    a valve controller configured to close the first valve and the second valve during a stoppage of power generation by the fuel cell; and
    a gas controller configured to supply the fuel gas to the anode catalyst layer during the stoppage of the power generation by the fuel cell, wherein
    the metal ion estimation unit is configured to estimate the content of the metal ions in the electrolyte membrane after a predetermined time passes from closing of the first valve and the second valve.

11. The fuel cell system according to claim 1, further comprising
    a supply connection pipe that connects a fuel gas supply pipe and an oxidant gas supply pipe, the fuel gas supply pipe supplying the fuel gas to the anode catalyst layer, the oxidant gas supply pipe supplying the oxidant gas to the cathode catalyst layer;
    a valve located in the supply connection pipe; and
    a gas controller configured to, during a stoppage of power generation by the fuel cell, stop supply of the oxidant gas to the cathode catalyst layer and open the valve so as to supply the fuel gas to the anode catalyst layer and the cathode catalyst layer, wherein
    the metal ion estimation unit is configured to estimate the content of the metal ions in the electrolyte membrane after a predetermined time passes from opening of the valve opens.

12. The fuel cell system according to claim 1, further comprising
    a setting unit configured to, when the content of the metal ions in the electrolyte membrane estimated by the metal ion estimation unit is greater than a threshold value, conducts a setting for executing at least one of (i) configuring an amount of the oxidant gas supplied to the cathode catalyst layer to be greater than that when the content of the metal ions in the electrolyte membrane estimated by the metal ion estimation unit is less than the threshold value, (ii) configuring a humidity of the oxidant gas supplied to the cathode catalyst layer to be higher than that when the content of the metal ions in the electrolyte membrane estimated by the metal ion estimation unit is less than the threshold value, and (iii) configuring a pressure of the oxidant gas in the cathode catalyst layer to be higher than that when the content of metal ions in the electrolyte membrane estimated by the metal ion estimation unit is less than the threshold value.

13. The fuel cell system according to claim 1, further comprising:
    a peak frequency determination unit configured to determine a peak frequency of the alternating-current voltage at which an imaginary part value of the alternating-current impedance measured by the impedance measuring device has a local maximum value when an alternating-current voltage of which a frequency is swept is applied to the fuel cell;
    a thickness determination unit configured to determine a thickness of the electrolyte membrane from the peak frequency determined by the peak frequency determination unit; and
    a fixed frequency determination unit configured to determine the fixed frequency from the thickness of the electrolyte membrane determined by the thickness determination unit.

14. A method of estimating a content of metal ions in an electrolyte membrane in a fuel cell that includes the electrolyte membrane, and an anode catalyst layer and a cathode catalyst layer sandwiching the electrolyte membrane, the method comprising:
    obtaining an imaginary part value of alternating-current impedance of the fuel cell when an alternating-current voltage with a fixed frequency satisfying $$\text{Fixed frequency [Hz]} \times (\text{Thickness of the electrolyte membrane [μm]})^2 \leq 500 \,[\text{Hz} \times \mu m^2]$$

is applied to the fuel cell in a state where a relative humidity of the membrane-electrode assembly is 20% or greater, and a fuel gas is present and an oxidant gas is absent in the anode catalyst layer and the cathode catalyst layer; and
    estimating the content of the metal ions in the electrolyte membrane on a basis of the imaginary part value of the alternating-current impedance that has been obtained.

* * * * *